United States Patent
Khandekar et al.

(10) Patent No.: US 8,305,943 B2
(45) Date of Patent: Nov. 6, 2012

(54) HALF-DUPLEX COMMUNICATION IN A FREQUENCY DIVISION DUPLEX SYSTEM

(75) Inventors: Aamod Khandekar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 11/748,878

(22) Filed: May 15, 2007

(65) Prior Publication Data

US 2007/0268848 A1 Nov. 22, 2007

Related U.S. Application Data

(60) Provisional application No. 60/801,763, filed on May 18, 2006.

(51) Int. Cl.
*H04L 5/14* (2006.01)

(52) U.S. Cl. ..................................... 370/295

(58) Field of Classification Search .................. 370/295, 370/296, 343, 276, 281, 330, 436, 478, 310, 370/389, 344
See application file for complete search history.

(56) References Cited

U.S. PATENT DOCUMENTS

| | | | | |
|---|---|---|---|---|
| 5,499,243 A * | 3/1996 | Hall | | 370/346 |
| 5,617,412 A * | 4/1997 | Delprat et al. | | 370/281 |
| 6,256,301 B1 * | 7/2001 | Tiedemann et al. | | 370/342 |
| 6,628,626 B1 * | 9/2003 | Nordgaard et al. | | 370/277 |
| 7,145,846 B2 | 12/2006 | Ando | | |
| 7,154,846 B2 * | 12/2006 | Chen et al. | | 370/209 |
| 7,262,955 B2 | 8/2007 | Ishida et al. | | |
| 7,339,926 B2 * | 3/2008 | Stanwood et al. | | 370/375 |
| 7,420,950 B2 * | 9/2008 | Barak et al. | | 370/337 |
| 7,564,822 B2 * | 7/2009 | Das et al. | | 370/335 |
| 7,626,955 B2 * | 12/2009 | Lenzini et al. | | 370/296 |
| 7,639,635 B2 * | 12/2009 | Anderson et al. | | 370/280 |
| 7,768,972 B2 * | 8/2010 | Goldhamer | | 370/329 |
| 2002/0102948 A1 | 8/2002 | Stanwood | | |
| 2002/0107605 A1 | 8/2002 | Serizawa et al. | | |
| 2002/0118666 A1 * | 8/2002 | Stanwood et al. | | 370/345 |
| 2004/0037241 A1 * | 2/2004 | Kim et al. | | 370/329 |

(Continued)

FOREIGN PATENT DOCUMENTS

EP 1492269 8/2002

(Continued)

OTHER PUBLICATIONS

Written Opinion, PCT/US2007/069291, International Searching Authority, European Patent Office, Jun. 12, 2007.

(Continued)

*Primary Examiner* — Kwang B Yao
*Assistant Examiner* — Anh Ngoc Nguyen
(74) *Attorney, Agent, or Firm* — Donald C. Kordich

(57) ABSTRACT

Systems and methodologies are described that provide half-duplex communication in a frequency division duplex (FDD) system. Communications in an FDD system may be divided into half-duplex interlaces, wherein a terminal may receive at one time period and transmit at another time period. An access network in an FDD system may then utilize half-duplex communication to communicate with an access terminal that is not capable of transmitting and receiving simultaneously by using a half-duplex interlace. Further, an access network may also utilize full-duplex communication to communicate with an access terminal that is capable of transmitting and receiving simultaneously.

49 Claims, 19 Drawing Sheets

U.S. PATENT DOCUMENTS

| | | | |
|---|---|---|---|
| 2006/0046658 A1* | 3/2006 | Cruz et al. | 455/67.11 |
| 2006/0280141 A1* | 12/2006 | McBeath et al. | 370/329 |
| 2007/0133611 A1* | 6/2007 | Li et al. | 370/503 |

FOREIGN PATENT DOCUMENTS

| | | |
|---|---|---|
| JP | 2005065207 A | 3/2005 |
| RU | 2109402 | 4/1998 |
| WO | 2004004244 | 1/2004 |
| WO | 2004107605 | 12/2004 |

OTHER PUBLICATIONS

International Preliminary Report on Patentability, PCT/US2007/069291, The International Bureau of WIPO, Geneva, Switzerland, Nov. 18, 2008.

International Search Report—PCT/US07/069291, International Search Authority—European Patent Office—Jun. 12, 2007.

Taiwan Search Report—TW096117859—TIPO—Mar. 28, 2011.

* cited by examiner

HALF-DUPLEX COMMUNICATION IN A FREQUENCY DIVISION DUPLEX SYSTEM

CROSS-REFERENCE

This application claims the benefit of U.S. Provisional Application Ser. No. 60/801,763, filed May 18, 2006, entitled "HALF-DUPLEX COMMUNICATION IN A FREQUENCY DIVISION DUPLEX SYSTEM," the entirety of which is incorporated herein by reference.

BACKGROUND

I. Field

The present disclosure relates generally to wireless communications, and more specifically to techniques for transmitting data in a wireless communication system.

II. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Traditionally, a wireless communication system, also referred to as an access network (AN), utilizes either frequency division duplexing (FDD) or time division duplexing (TDD) for data transmission between base stations and terminals (e.g., access terminals or ATs) on the forward and reverse links. The forward link (or "downlink") refers to the communication link from the base stations to one or more terminals, while the reverse link (or "uplink") refers to the communication link from a terminal to one or more base stations. In a wireless communication system utilizing FDD, separate frequency channels are used for the forward and reverse links. A terminal may simultaneously receive data on a forward link (FL) frequency channel and transmit data on a reverse link (RL) frequency channel. In contrast, in a wireless communication system utilizing TDD, a single frequency channel is used for both the forward and reverse links. The transmission timeline in such a system is partitioned into time intervals, with certain time intervals being used for FL transmission and other time intervals being used for RL transmission. Based on this partitioning, a terminal may transmit data on the frequency channel in time intervals reserved for RL transmission and may receive data in time intervals reserved for FL transmission.

A terminal designed for operation in an FDD system is able to receive and transmit at the same time by using a duplexer, which assigns FL communications and RL communications different frequency bands to allow simultaneous FL and RL communication. However, a terminal may be designed for operation in a TDD system and may lack a duplexer to allow the terminal to receive and transmit at the same time. Thus, the terminal would not be able to operate in a typical FDD system that supports simultaneous transmission and reception on two frequency channels. Further, duplexers can be costly to implement and as a result may not be desirable for some terminals in an access network. In addition, it has traditionally been difficult to build a duplexer for a terminal that operates in a high-bandwidth access network that cleanly separates two frequency bands due to the high bandwidth of the network.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

The described embodiments mitigate the above-mentioned problems by providing half-duplex communication in an FDD system. More particularly, one or more embodiments separate communications in an FDD system into half-duplex interlaces, wherein a terminal may receive at one time period and transmit at another time period in a similar manner to a TDD system. By separating an FDD system into half-duplex interlaces, a terminal that lacks a duplexer (e.g., a terminal designed for operation in TDD systems) may be allowed to function in an FDD system.

According to an aspect, a method that facilitates half-duplex communication in a wireless communication system is described herein. The method may comprise determining a half-duplex interlace to use for communication from among a plurality of half-duplex interlaces, each half-duplex interlace in the plurality of half-duplex interlaces including temporally non-overlapping frames for a forward link and a reverse link. Further, the method may include communicating using frames of the half-duplex interlace determined for use.

Another aspect relates to a wireless communications apparatus that may include a memory that stores data relating to a plurality of half-duplex interlaces, wherein each of the plurality of half-duplex interlaces includes temporally non-overlapping frames for a forward link and a reverse link. Further, the wireless communications apparatus may include a processor configured to determine a half-duplex interlace to use for communication from among the plurality of half-duplex interlaces.

Yet another aspect relates to an apparatus that facilitates half-duplex communication in a wireless communication system. The apparatus may comprise means for determining a half-duplex interlace to use for communication from among a plurality of half-duplex interlaces, each half-duplex interlace in the plurality of half-duplex interlaces including temporally non-overlapping frames for a forward link and a reverse link. Additionally, the apparatus may include means for communicating using frames of the half-duplex interlace determined for use.

Still another aspect relates to a computer-readable medium having stored thereon computer-executable instructions for half-duplex communication in a wireless communication system. The instructions may comprise allocating frames of a forward link and a reverse link among a plurality of half-duplex interlaces such that each of the plurality of half-duplex interlaces has temporally non-overlapping frames. Additionally, the instructions may also include associating an access terminal with a half-duplex interlace from the plurality of half-duplex interlaces. Further, the instructions may include communicating with the access terminal using frames allocated for the associated half-duplex interlace.

In accordance with another aspect, a processor is described herein that may execute computer-executable instructions for half-duplex communication in a wireless communication system. These instructions may include communicating with a first terminal using half-duplex in a frequency division duplex (FDD) communication system. These instructions may additionally include communicating with a second terminal using full-duplex.

In accordance with yet another aspect, a method that facilitates half-duplex communication in a wireless communication system is described herein. The method may comprise associating with a half-duplex interlace chosen from a plurality of half-duplex interlaces for communication with an access network, each half-duplex interlace including temporally non-overlapping frames for a forward link and a reverse link. In addition, the method may include communicating with the access network using frames of the associated half-duplex interlace.

Another aspect relates to a wireless communications apparatus, which may comprise a memory that stores data relating to an associated half-duplex interlace, the selected half-duplex interlace includes temporally non-overlapping frames for a forward link and a reverse link. Further, the wireless communications apparatus may include a processor configured to communicate with an access network using frames of the associated half-duplex interlace.

Yet another aspect relates to an apparatus that facilitates half-duplex communication in a wireless communication system. The apparatus may include means for associating with a half-duplex interlace chosen from a plurality of half-duplex interlaces for communication with an access network, each half-duplex interlace including temporally non-overlapping frames for a forward link and a reverse link. Additionally, the apparatus may include means for communicating with the access network using frames of the associated half-duplex interlace.

In accordance with another aspect, a computer-readable medium having stored thereon computer-executable instructions for half-duplex communication in a wireless communication system. The instructions may comprise associating with a half-duplex interlace selected from a plurality of half-duplex interlaces, each of the plurality of half-duplex interlaces having allocated frames of a forward link and a reverse link such that each of the plurality of half-duplex interlaces has temporally non-overlapping frames. Further, the instructions may include communicating with an access network using the allocated frames for the associated half-duplex interlace.

Still another aspect relates to a processor that executes computer-executable instructions for half-duplex communication in a wireless communication system. The instructions may include receiving an assignment of resources in frames of a half-duplex interlace selected from a plurality of half-duplex interlaces. In addition, the instructions may include communicating with an access network using the assigned resources.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
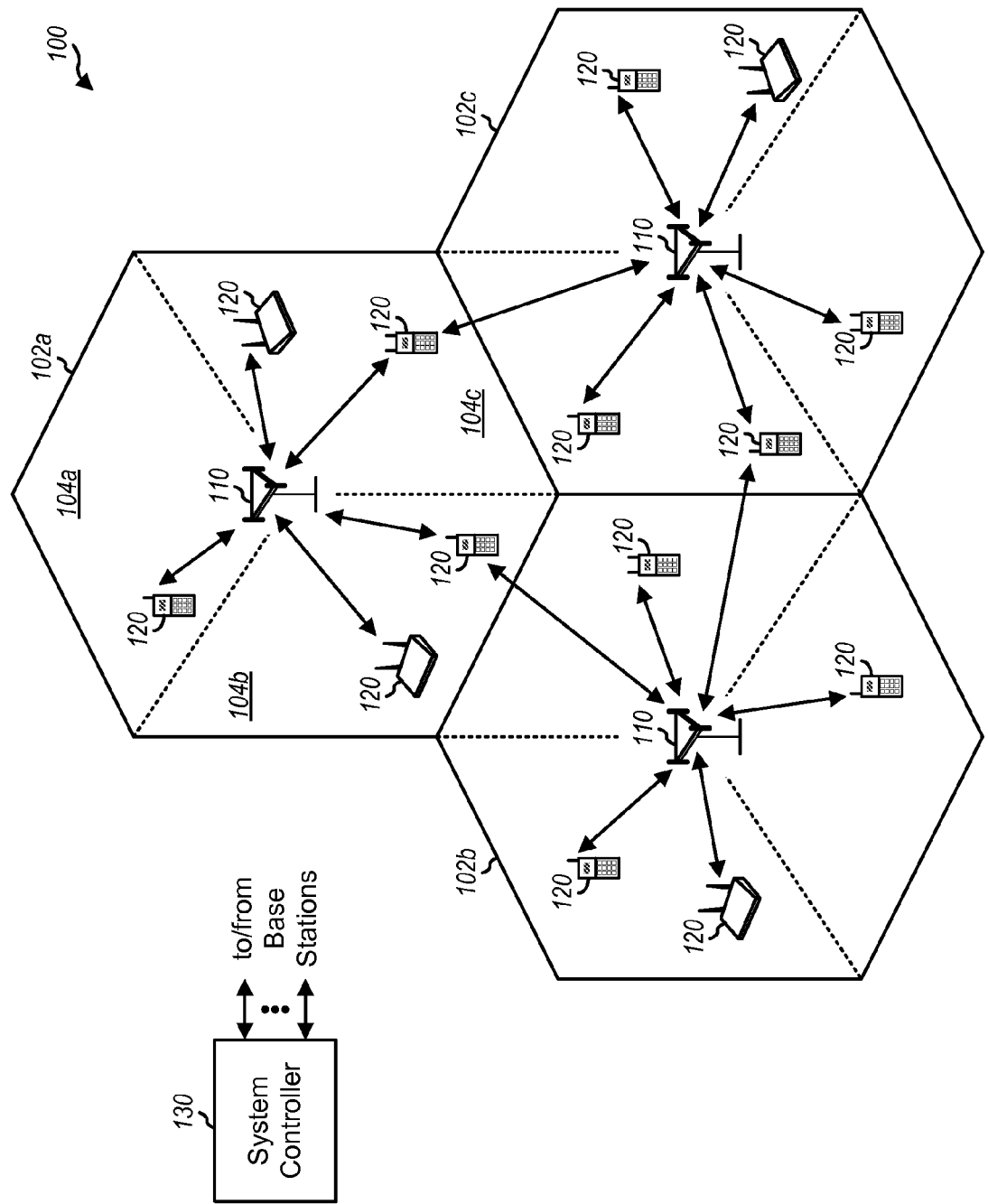
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 may be an access point, a Node B, and/or another appropriate network entity. Each base station 110 provides communication coverage for a particular geographic area 102. As used herein and generally in the art, the term "cell" can refer to a base station 110 and/or its coverage area 102 depending on the context in which the term is used. To improve system capacity, the coverage area 102 corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. In a cell 102 having multiple sectors 104, the BTSs for all sectors 104 of the cell 102 can be co-located within the base station 110 for the cell 102.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed.

In accordance with one aspect, terminals 120 may be dispersed throughout the system 100. Each terminal 120 may be stationary or mobile. By way of non-limiting example, a terminal 120 may be an access terminal (AT), a mobile station, user equipment, a subscriber station, and/or another appropriate network entity. A terminal may be a wireless device, a cellular phone, a personal digital assistant (PDA), a wireless modem, a handheld device, and so on.

In accordance with another aspect, system 100 may utilize FDD and support simultaneous transmission on a forward link (FL) and a reverse link (RL) via two separate frequency channels. In addition, system 100 may support full-duplex communication for terminals 120 that are capable of full-duplex operation ("full-duplex terminals"). As used herein and generally in the art, full-duplex refers to a mode in which a station (e.g., a base station 110 or a terminal 120) may simultaneously transmit and receive at the same time. In one example, a station capable of full-duplex operation may be equipped with a single antenna for both transmission and reception. Thus, the station can have a duplexer, which can route a received signal from the antenna to a receiver for data reception and route a modulated signal from a transmitter to the antenna for data transmission.

Additionally, system 100 may also support half-duplex communication for terminals 120 not capable of full-duplex operation ("half-duplex terminals"). As used herein and generally in the art, half-duplex refers to a mode in which a station may either transmit or receive at any given moment but may not simultaneously transmit and receive. In one example, a station capable only of half-duplex operation may be equipped with a single antenna for both transmission and reception. Thus, the station may have a switch that can connect the antenna to a receiver during periods of data reception and connect a transmitter to the antenna during periods of data transmission.

In another example, system 100 may utilize one or more multiple-access schemes, such as CDMA, TDMA, FDMA, OFDMA, Single-Carrier FDMA (SC-FDMA), and/or other suitable multiple-access schemes. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which may be modulated with data. Typically, modulation symbols are sent in the frequency domain with OFDM and in the time domain with SC-FDM. Additionally, system 100 may utilize a combination of multiple-access schemes, such as OFDMA and CDMA. Additionally, system 100 may utilize various framing structures to indicate the manner in which data and signaling are sent on the forward and reverse links. For clarity, non-limiting examples of framing structures that system 100 may utilize are described in more detail herein.

Additionally, system 100 may support hybrid automatic repeat request (H-ARQ) transmission, which is also referred to in the art as incremental redundancy (IR) transmission. With H-ARQ, a data packet can be sent in one transmission and, if needed, one or more retransmissions until the data packet has been decoded correctly or the maximum number of retransmissions have been sent.

Figure 2:
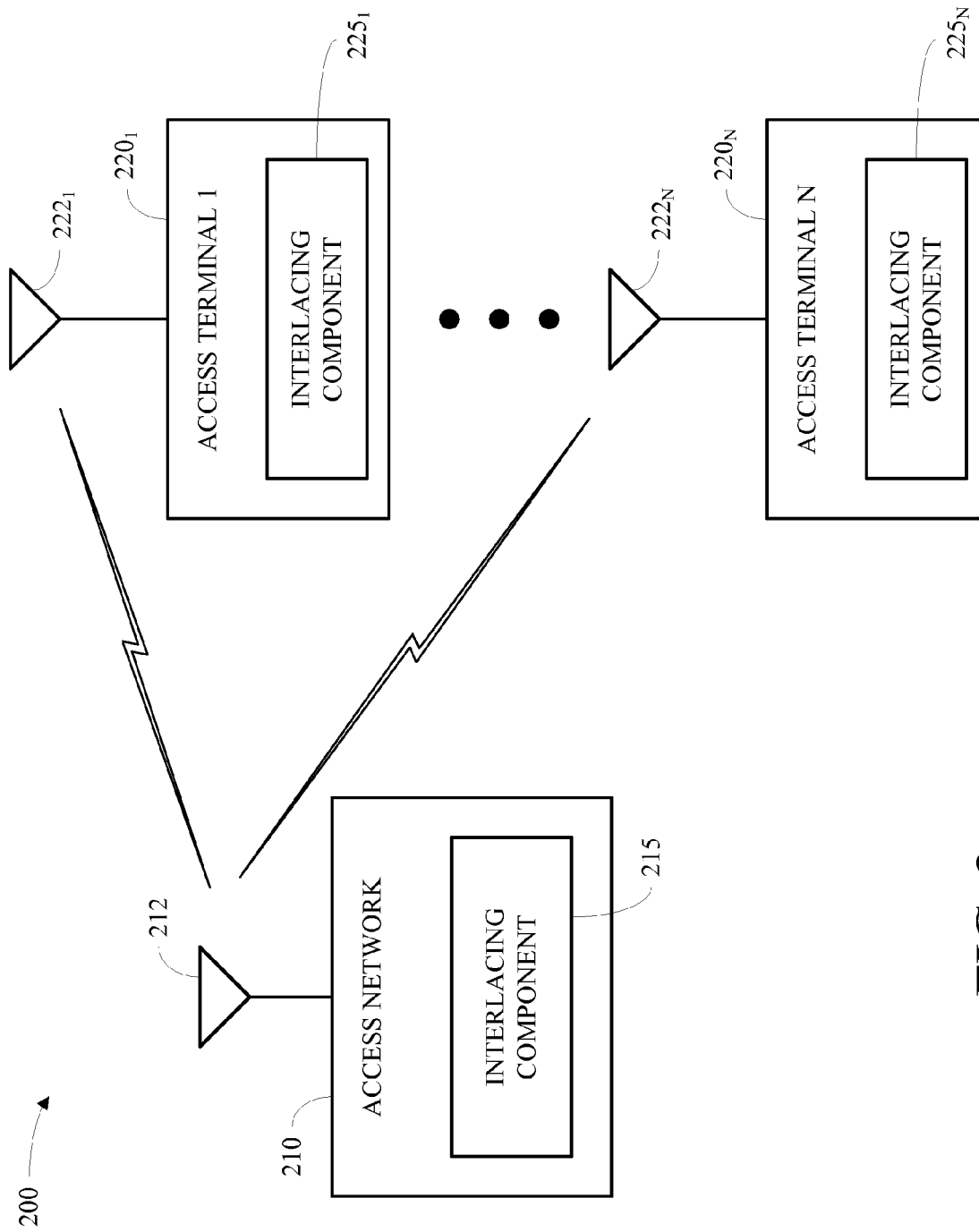
FIG. 2 is a block diagram of a system that provides half-duplex communication in accordance with various aspects.

FIG. 2 is a block diagram of a system 200 that provides half-duplex communication in accordance with various aspects described herein. In one example, system 200 includes an access network (AN) 210 and one or more access terminals (ATs) 220. In another example, multiple access networks 210 may also be employed within the system 200. An access network 210 can be, for example, a wireless communication system (e.g., system 100) or an individual base station within a system (e.g., a base station 110). Additionally, an access terminal 220 can be, for example, a terminal in a wireless communication system (e.g., a terminal 120).

In accordance with one aspect, the access network 210 and access terminals 220 can communicate on a forward link (FL) and a reverse link (RL) via antenna 212 at access network 210 and antennas 222 at access terminals 220. Additionally, access network 210 and/or access terminals 220 may have a plurality of antennas 212 and/or 222 for communicating with multiple access networks 210 and/or access terminals 220 in the system 200.

In accordance with another aspect, system 200 can utilizes FDD communication. However, one or more access terminals 220 may not be designed for operation in a system that utilizes FDD communication. For example, an access terminal 220 may lack a duplexer or other means to allow the access terminal 220 to transmit and receive simultaneously, as required in conventional FDD full-duplex communication. To allow these access terminals 220 to function in system 200, an access network 210 may include an interlacing component 215 that partitions the FL and RL transmission timelines into multiple half-duplex interlaces. Further, one or more access terminals 220 may also have an interlacing component 225.

In one example, interlacing components 215 and 225 partition the FL and RL transmission timelines into two equal half-duplex interlaces. The interlacing components 215 and 225 can then divide the access terminals 220 between the two half-duplex interlaces. This division can be based on multiple factors, such as the number of access terminals on a given interlace, load balancing between the interlaces, and/or other suitable factors. In another example, access terminals 220 can be divided between half-duplex interlaces by initially assigning each access terminal 220 to an interlace based on information obtained from the access terminal 220. This information can be a Medium Access Control Identifier (MACID), Internet Protocol (IP) address, terminal name, and/or any other element of the identity of an access terminal 220 in system 200 as well as other appropriate information. In a non-limiting example utilizing a MACID of one or more access terminals 220, access terminals 220 with an even MACID can be assigned to one interlace while access terminals 220 with an odd MACID can be assigned to another interlace. Additionally, an access terminal 220 can be reassigned to another interlace if necessary by reassigning the MACID of the access terminal 220.

In accordance with another aspect, an access terminal 220 may be capable of full-duplex operation within system 200. In this case, the access terminal 220 may not be assigned a half-duplex interlace and may be allowed to communicate with an access network 210 in both FL and RL on any interlace.

Figure 3:
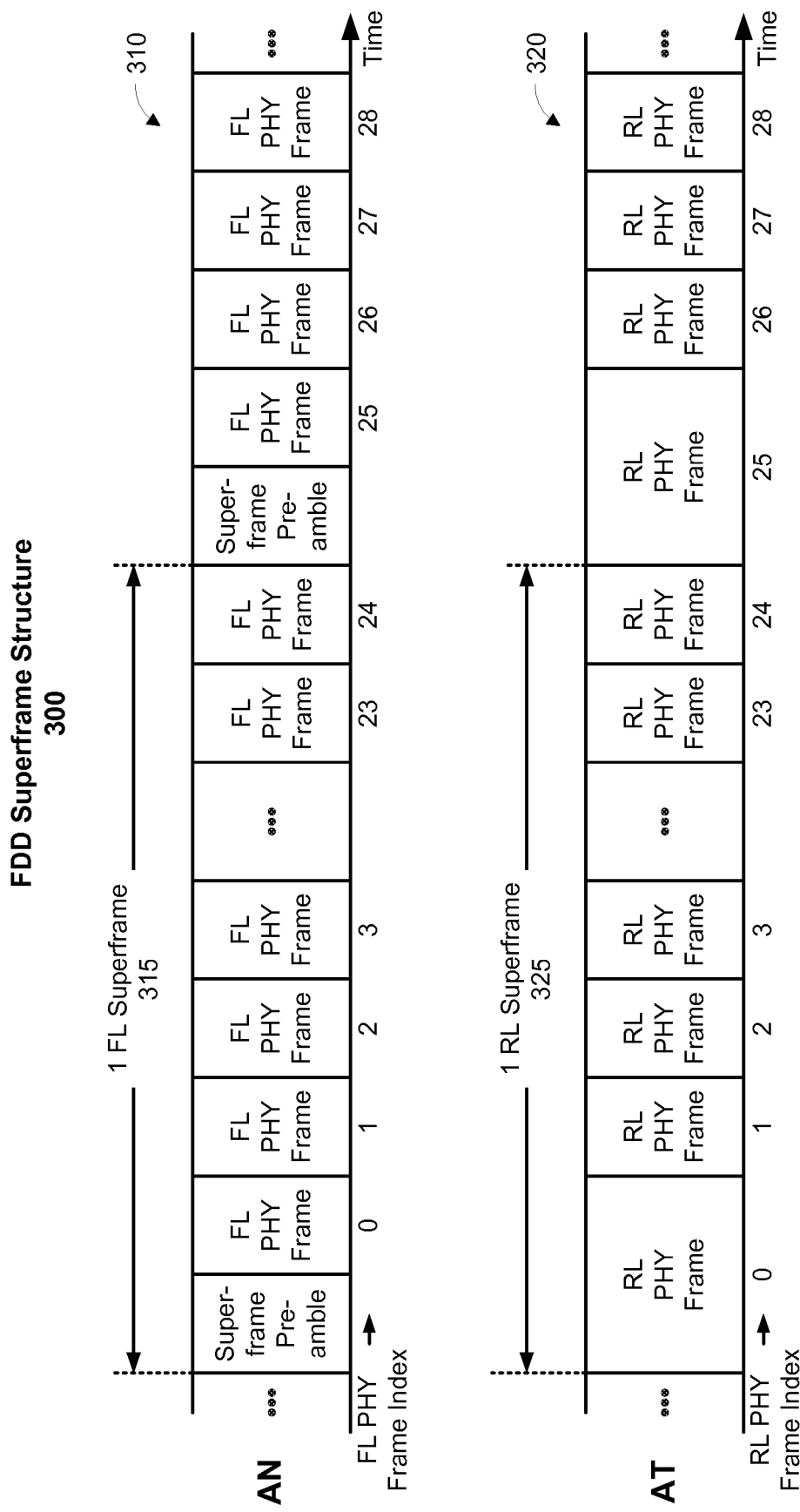
FIG. 3 illustrates an example FDD superframe structure in accordance with various aspects.

FIG. 3 is a diagram illustrating an example FDD superframe structure 300. In one example, the transmission timeline 310 for the forward link is partitioned into units of superframes 315, and the transmission timeline 320 for the reverse link is partitioned into units of superframes 325. Each superframe 315 and 325 spans a particular time duration, which may be fixed or configurable. In one non-limiting example, each forward link superframe 315 can include a preamble followed by 25 physical layer (PHY) frames (or simply "frames"). In an alternative non-limiting example, each forward link superframe 315 can include some other odd number of frames in order to allow asynchronous operation between half-duplex interlaces. This may be done, for example, to allow a terminal assigned to one half-duplex interlace to receive superframe preambles communicated on other half-duplex interlaces by other sectors asynchronously with the sector serving the terminal on the forward link. In general, however, it is to be appreciated that a superframe may span any time duration and may include any number of frames and other fields. As used herein and generally in the art, a "frame" may refer to a time interval in a transmission timeline 310 and 320 or a transmission sent during the time interval, depending on the context in which the term is used. The superframe preamble in forward link superframe 315 can carry overhead and system information that may enable one or more terminals to receive forward link control channels and subsequently access the system. Each subsequent frame in the forward link superframe 315 may then carry traffic data and/or signaling. In accordance with another aspect, each reverse link superframe 325 can include 25 frames, where the first frame may be extended by the length of the superframe preamble on the forward link. In one example, each reverse link superframe 325 is time aligned with a corresponding forward link superframe 315. Further, as illustrated by forward link transmission timeline 310 and reverse link transmission timeline 320, the frames for each link may be assigned sequentially increasing indices. In one example, the frame index may start at zero at a predetermined time instant, increment by one for each frame until a maximum index is reached, and then wrap around to zero.

In FDD superframe structure 300, one or more base stations (e.g., base stations 110) may transmit data and/or signaling on each forward link frame to the terminals (e.g., terminals 120). The terminals, if scheduled, may then transmit data and/or signaling on each reverse link frame to the base stations. Additionally, a base station and a terminal may simultaneously transmit and receive data and/or signaling via the forward and reverse links.

Figure 4:
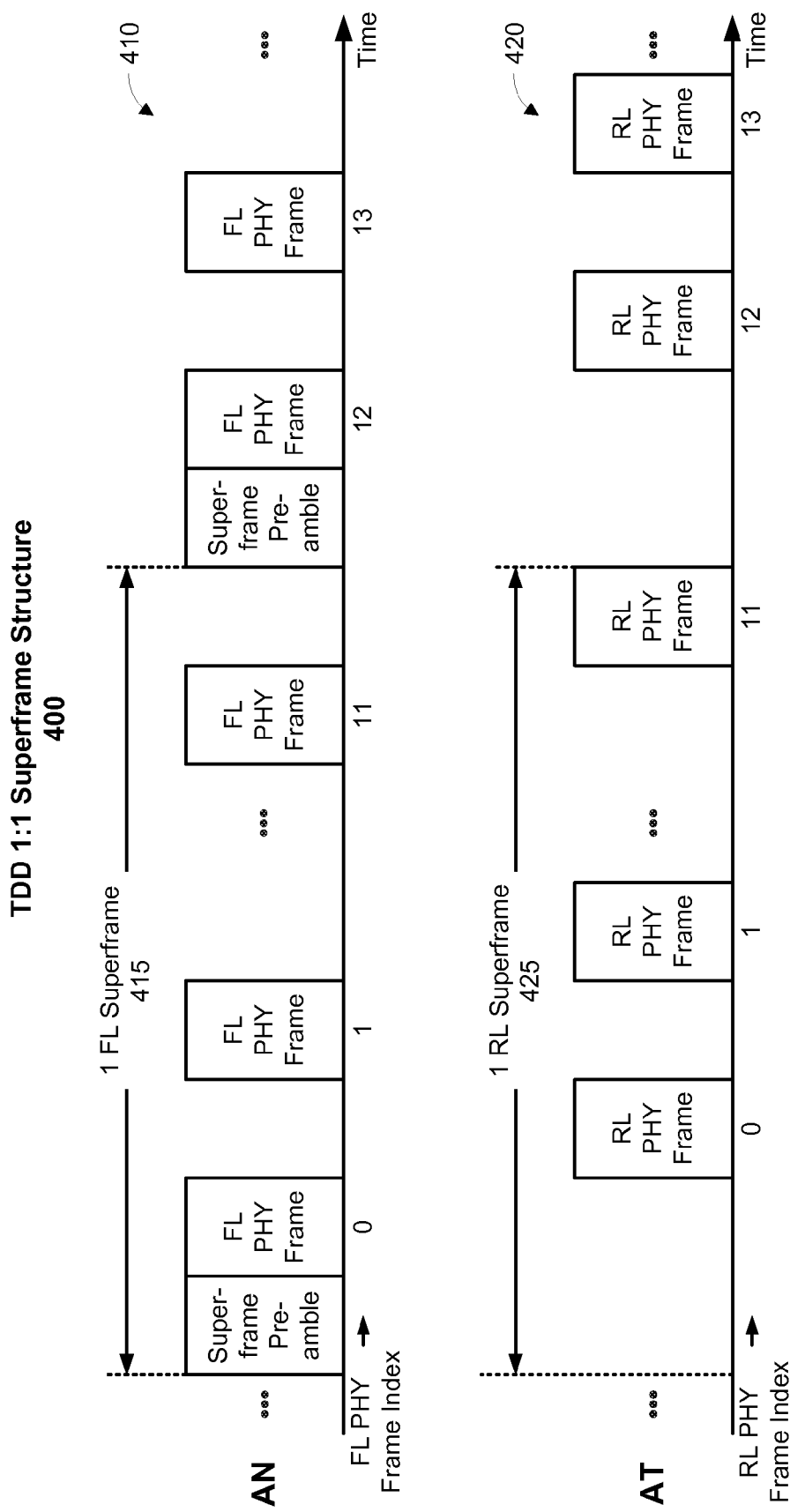
FIG. 4 illustrates an example TDD 1:1 superframe structure in accordance with various aspects.

FIG. 4 is a diagram illustrating an example TDD 1:1 superframe structure 400. In one example, the forward link transmission timeline 410 and reverse link transmission timeline 420 are partitioned into respective superframes 415 and 425. Each forward link superframe 415 can combine with a corresponding reverse link superframe 425 to include a preamble followed by 24 frames in a similar manner to superframes 315 and 325. Additionally, the frames in each set of superframes 415 and 425 can be alternately assigned to the forward and reverse links such that frames with even-numbered indices are assigned to the forward link and frames with odd-numbered indices are assigned to the reverse link. Thus, in a non-limiting example, each forward link superframe 415 in superframe structure 400 can include a preamble followed by 12 forward link frames that are spaced apart by one frame, with the first forward link frame immediately following superframe preamble. In this non-limiting example, each reverse link superframe 425 can then include 12 reverse link frames that are also spaced apart by one frame. The reverse link frames can be staggered by one frame from the forward link frames. The denotation "1:1" as used in FIG. 4 can be used to describe such a repeating pattern of one forward link frame followed by one reverse link frame. Further, as illustrated by forward link transmission timeline 410 and reverse link transmission timeline 420, the frames for each link may be assigned sequentially increasing indices.

In TDD superframe structure 400, one or more base stations (e.g., base stations 110) may transmit data and/or signaling on each forward link frame to the terminals (e.g., terminals 120). The terminals, if scheduled, may then transmit data and/or signaling on each reverse link frame to the base stations. Because the forward link frames are staggered from the reverse link frames, a base station and/or terminal can either transmit or receive, but not both, in a given frame.

Figure 5A:
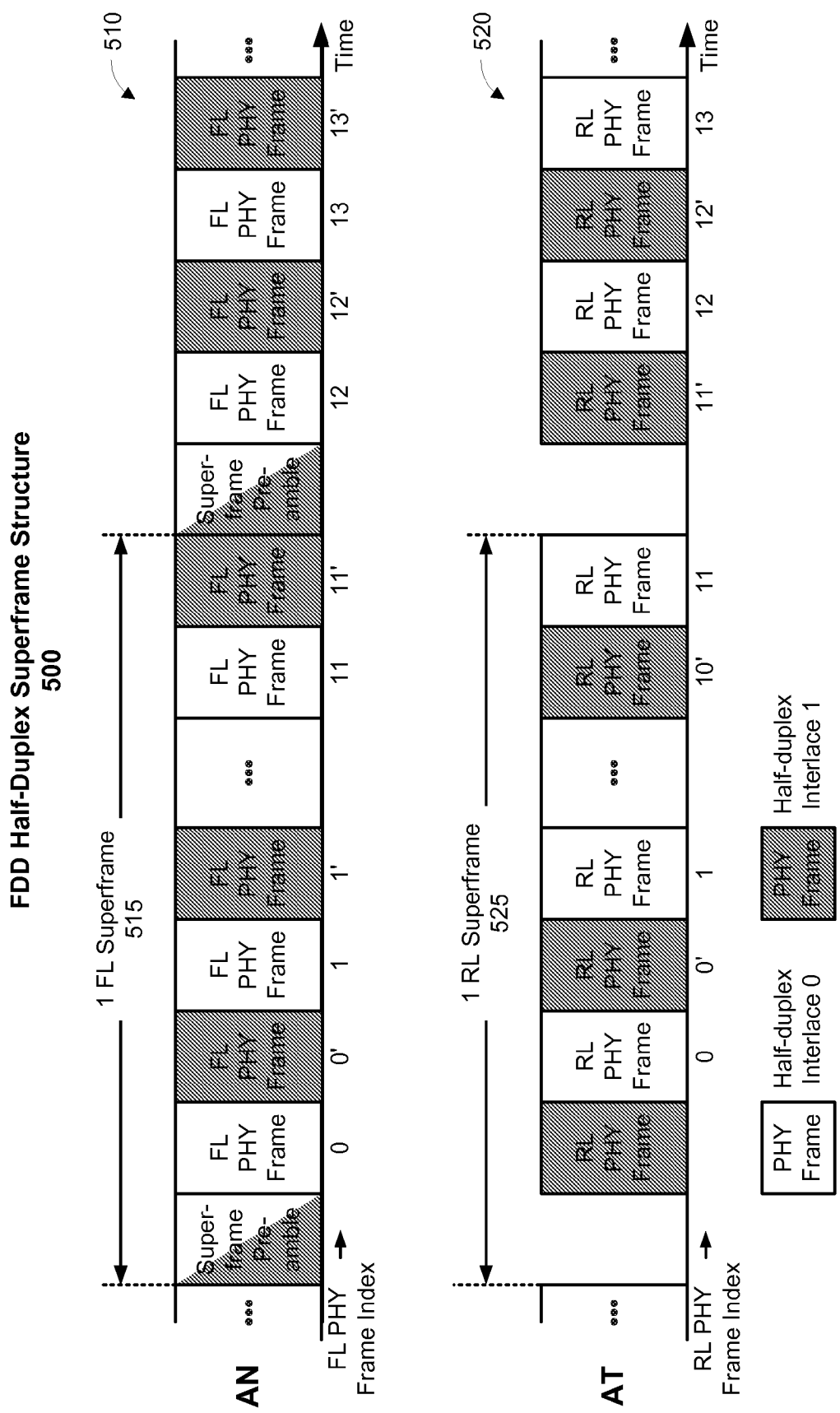
FIGS. 5A-5C illustrates an example FDD half-duplex superframe structure in accordance with various aspects.

FIG. 5A is a diagram illustrating an example FDD half-duplex superframe structure 500 in accordance with various aspects described herein. In one example, the forward link transmission timeline 510 and reverse link transmission timeline 520 are partitioned into respective superframes 515 and 525. Each forward link superframe 515 can combine with a corresponding reverse link superframe 525 to include a preamble followed by 24 frames in a similar manner to superframes 315 and 325. In a non-limiting example, each forward link superframe 515 in superframe structure 500 can include a preamble followed by 24 forward link frames, and each reverse link superframe 525 in superframe structure 500 can include 24 reverse link frames preceded by a time interval corresponding to the superframe preamble in forward link superframe 515.

In another example, two half-duplex interlaces, half-duplex interlace 0 and half-duplex interlace 1, can be defined. While the term "half-duplex interlace" is used in the present specification, it should be appreciated that this is merely one term that can be used and that any appropriate terminology may be used in connection with the aspects described herein. In one example, half-duplex interlace 0 can include (1) every other forward link frame starting with the first forward link frame after the superframe preamble and (2) every other reverse link frame starting with the second reverse link frame after the superframe preamble. Thus, half-duplex interlace 0 can include each forward link and reverse link frame in TDD 1:1 superframe structure 400. In another example, half-duplex interlace 1 can include (1) every other forward link frame starting with the second forward link frame after the superframe preamble and (2) every other reverse link frame starting with the first reverse link frame after the superframe preamble. Thus, half-duplex interlace 1 can be complementary to half-duplex interlace 0. More particularly, half-duplex interlace 1 can include forward link and reverse link frames in place of reverse link and forward link frames respectively included in half-duplex interlace 0. In addition, both half-duplex interlaces can share a common superframe preamble. Each half-duplex interlace can also include temporally non-overlapping frames for the forward and reverse links, which means that the forward link frames do not overlap the reverse link frames in time.

While the above example describes a superframe structure 500 having two half-duplex interlaces, it should be appreciated that any number of half-duplex interlaces can be defined. Furthermore, the half-duplex interlaces may include the same number of forward link and reverse link frames staggered from one another, or the half-duplex interlaces may include different numbers of forward link and reverse link frames. Additionally, while the forward link and reverse link frames of each half-duplex interlace in superframe structure 500 abut one another, a guard time can also be provided between the forward link and reverse link frames of each half-duplex interlace in order to give a half-duplex terminal an amount of time to switch between transmitting and receiving.

In one example, the frames of half-duplex interlace 0 for each link are assigned sequentially increasing indices, as illustrated by forward link timeline 510 and reverse link timeline 520. Similarly, the frames of half-duplex interlace 1 for each link can also be assigned sequentially increasing indices using prime notation (e.g., 1', 2', ...), such that a forward link frame n' of half-duplex interlace 1 follows forward link frame n of half-duplex interlace 0 and a reverse link frame n' of half-duplex interlace 1 follows a reverse link frame n of half-duplex interlace 0.

Terminals (e.g., terminals 120) in a wireless communication system utilizing superframe structure 500 (e.g., system 100) can access the system via one or more of the half-duplex interlaces in various ways. In one example, a terminal can randomly select one of the two half-duplex interlaces to access the system. In another example, a terminal can determine a half-duplex interlace that should be used for system access and access the system via the determined half-duplex interlace. Information regarding which half-duplex interlace to use for system access may be sent via a block of overhead parameters over a data channel, known a priori by the terminal, or provided in some other manner.

Additionally and/or alternatively, a base station (e.g., a base station 110) may determine the capability of a terminal and ascertain whether the terminal supports full-duplex or half-duplex operation. If the terminal supports full-duplex operation, the base station can assign resources in any frame to the terminal. If the terminal only supports half-duplex operation, the base station can then assign the terminal to a half-duplex interlace and assign resources in the frames of the half-duplex interlace assigned to the terminal. For example, if a terminal is assigned half-duplex interlace 0, a base station may assign resources in forward link and reverse link frames of half-duplex interlace 0 to the terminal. Conversely, if a terminal is assigned half-duplex interlace 1, then a base station may assign resources in forward link and reverse link frames of half-duplex interlace 1 to the terminal.

With respect to the above examples, a half-duplex terminal may be assigned a half-duplex interlace in various ways. In one example, a half-duplex interlace can be automatically selected for a terminal based on the Medium Access Control Identifier (MACID) of the terminal, which may be used to identify the terminal in communication with a base station. More specifically, a terminal may be assigned to one half-duplex interlace if its MACID is even and may be assigned to another half-duplex interlace if its MACID is odd. In another example, a terminal can be assigned a half-duplex interlace based on an Internet Protocol (IP) address, some other identifier, or some other address of the terminal. The mapping between an identifier/address of a terminal to a half-duplex interlace may be performed based on a rule (e.g., as described above with even and odd MACIDs), a hashing function, or some other mapping scheme. In another example, a base station can assign a half-duplex terminal to a half-duplex interlace during system access. More particularly, a base station can select a half-duplex interlace for a terminal based on respective loading of given half-duplex interlaces, quality of service (QoS) data, and/or other factors. In yet another example, a half-duplex terminal can select a half-duplex interlace and inform a base station of its choice. These examples are provided by way of illustration and not limitation, and it is to be appreciated that a terminal can be assigned a half-duplex interlace in other manners.

In accordance with one aspect, data and signaling are exchanged between a base station and a half-duplex terminal in frames of a half-duplex interlace assigned to the terminal. On the forward link, a base station may transmit data and signaling (e.g., power control bits, erasure indicators, pilot quality indicators, interference levels, and so on) to the terminal only in forward link frames of the half-duplex interlace assigned to the terminal. Signaling may be transmitted on the forward link, for example, on a power control channel (F-PCCH), a pilot quality indicator channel (F-PQICH), an interference over thermal channel (F-IOTCH), a fast other sector interference channel (F-FOSICH), a shared control channel (F-SCCH), and/or other appropriate channels. Signaling communicated on either half-duplex interlace may also include pilots, such as CQI pilots over a forward link CQI pilot channel (F-CQIPICH) and/or beacon pilots over a forward link beacon pilot channel (F-BPICH). On the reverse link, the terminal may transmit data and signaling to the base station only in reverse link frames of the half-duplex interlace assigned to the terminal.

Figure 5B:
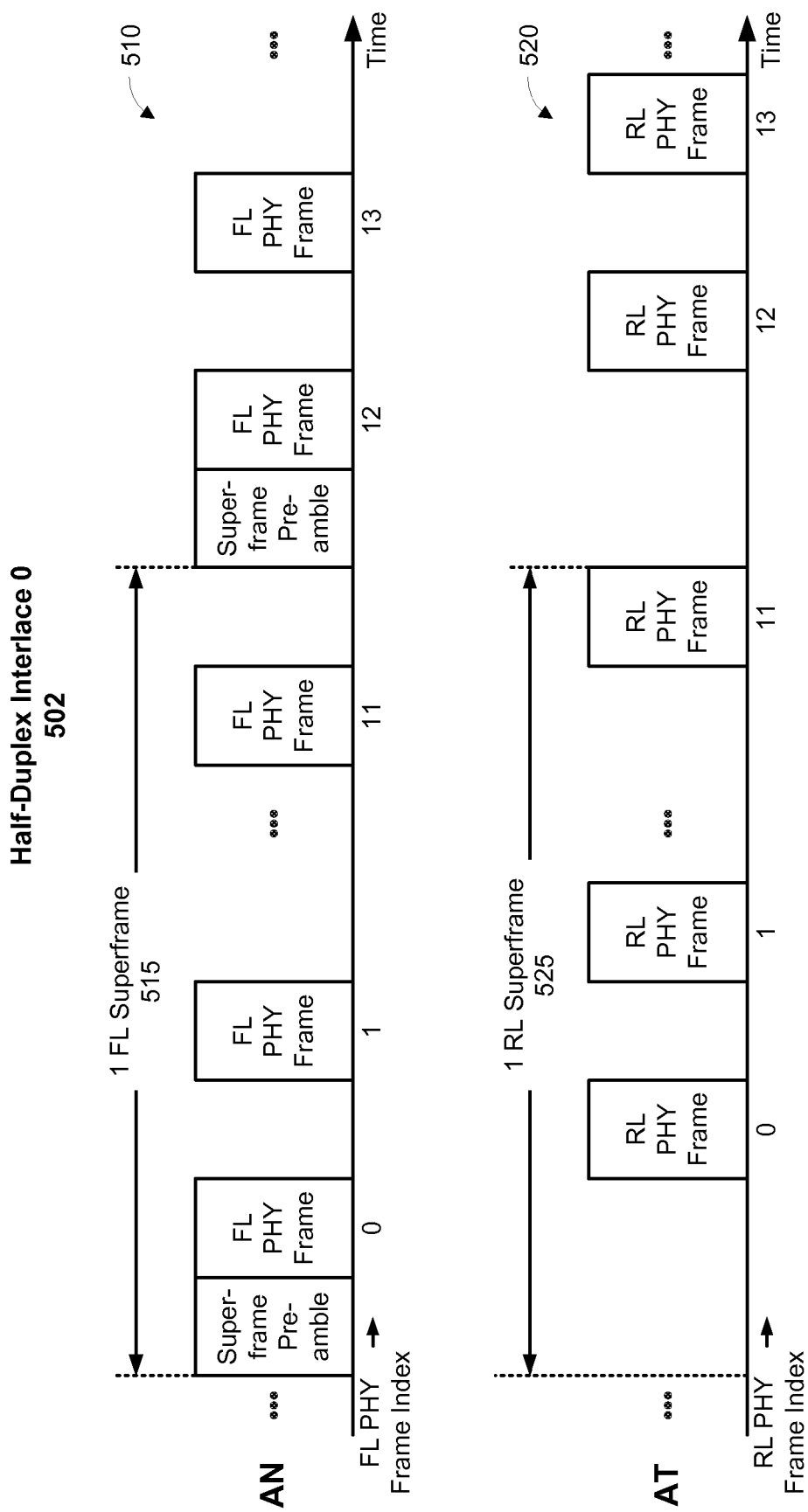

FIG. 5B illustrates a FDD superframe structure 502 for half-duplex interlace 0. In FDD superframe structure 502, the superframe preamble as well as the forward link and reverse link frames in half-duplex interlace 0 may be used for communication between a base station (e.g., base station 110) and one or more terminals assigned to half-duplex interlace 0 (e.g., terminals 120). In accordance with one aspect, terminals assigned to half-duplex interlace 0 do not use the forward link and reverse link frames of half-duplex interlace 1.

Figure 5C:
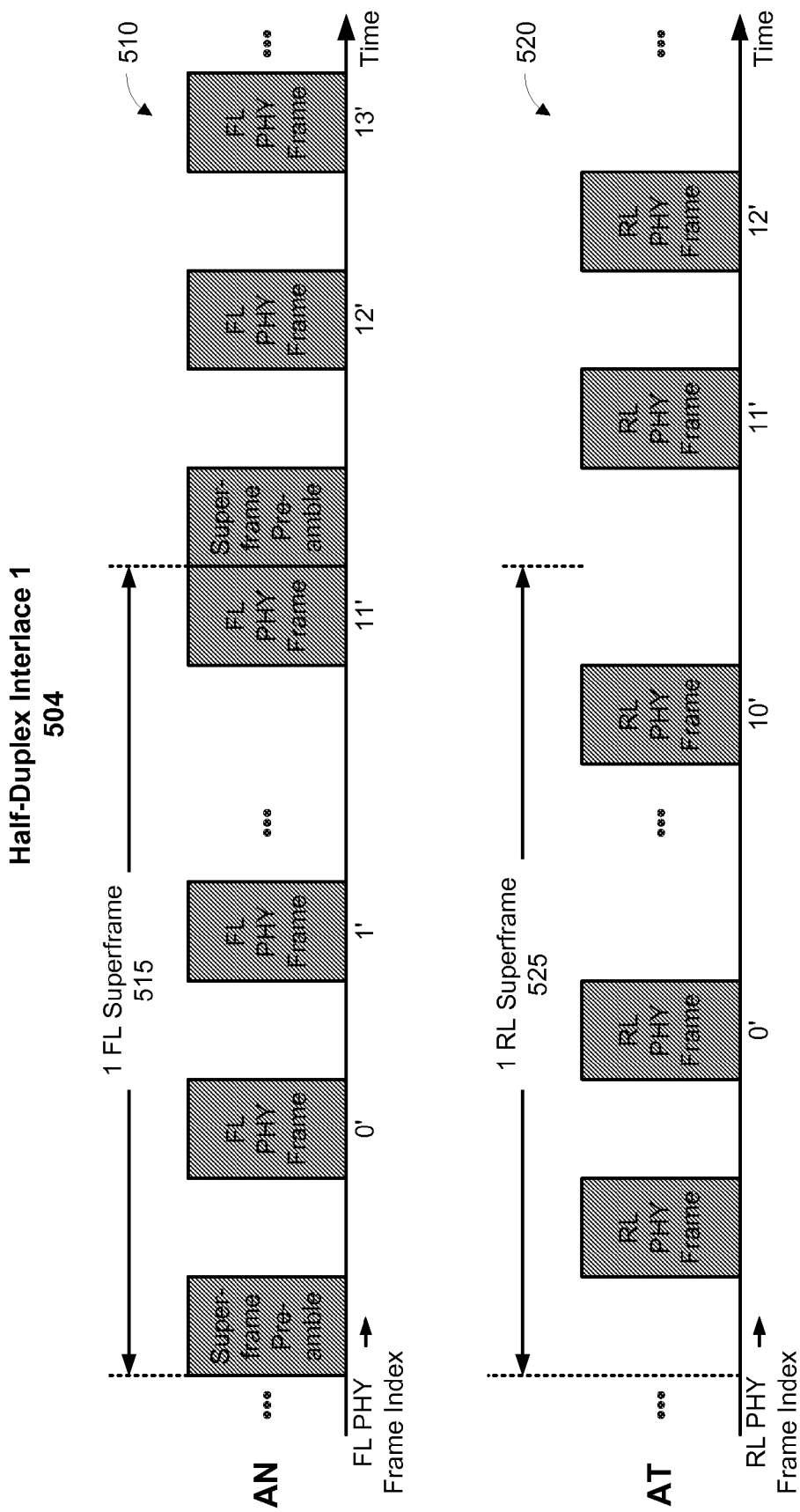

FIG. 5C illustrates a FDD superframe structure 504 for half-duplex interlace 1. In FDD superframe structure 504, the superframe preamble as well as the forward link and reverse link frames in half-duplex interlace 1 may be used for communication between a base station (e.g., base station 110) and one or more terminals assigned to half-duplex interlace 1 (e.g., terminals 120). In accordance with one aspect, terminals assigned to half-duplex interlace 1 do not use the forward link and reverse link frames of half-duplex interlace 0.

Figure 6:
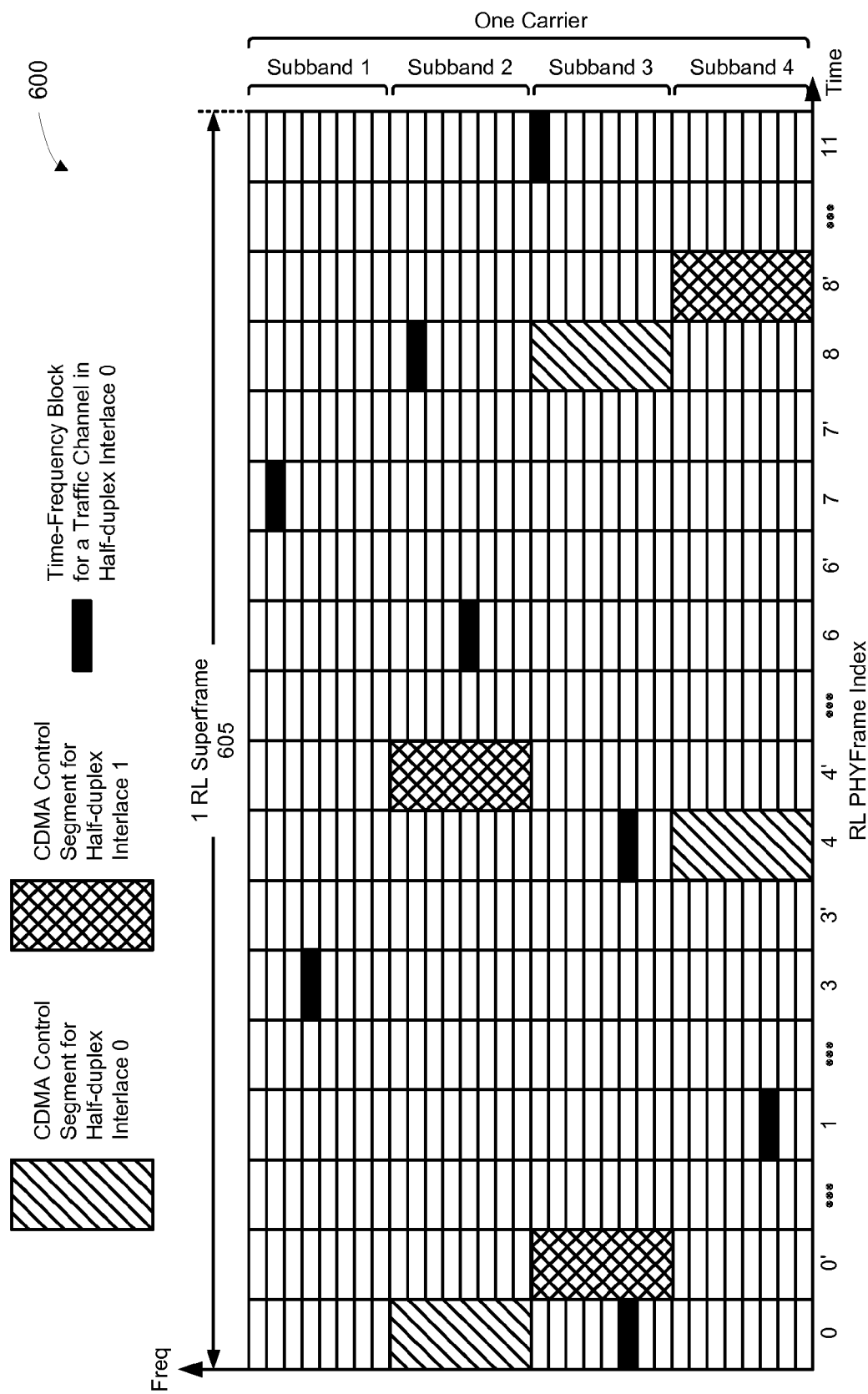
FIG. 6 illustrates an example transmission scheme for CDMA control segments in accordance with various aspects.

FIG. 6 is a diagram illustrating an example transmission scheme 600 for CDMA control segments. In accordance with one aspect, various signaling channels for the reverse link are sent in CDMA control segments. In addition, multiple terminals (e.g., terminals 120) may simultaneously send signaling on a CDMA control segment by channelizing their signaling with (1) different orthogonal codes, which may be Walsh codes, OVSF codes, or some other code, (2) pseudo-random sequences, and/or (3) a combination of different codes. In one example, a CDMA control segment can be mapped to a fixed region of time and frequency in each frame in which the CDMA control segment is sent. In another example, a CDMA control segment can hop in a pseudo-random or deterministic manner from a CDMA frame to another CDMA frame to achieve frequency diversity.

By way of a specific, non-limiting example, a CDMA control segment can be sent in every eighth frame in a reverse link superframe 605 for each of two half-duplex interlaces. Thus, a CDMA control segment for half-duplex interlace 0 can be sent in reverse link frames 0, 4, 8, and so on, and a CDMA control segment for half-duplex interlace 1 can be sent in reverse link frames 0', 4', 8', and so on. Half-duplex terminals assigned to half-duplex interlace 0 can send signaling on the CDMA control segment for interlace 0, and half-duplex terminals assigned to half-duplex interlace 1 can send signaling on the CDMA control segment for interlace 1. Additionally, a full-duplex terminal may use the CDMA control segment for either half-duplex interlace 0 or 1. The signaling sent by the terminals can include channel quality indicators (CQIs), data requests, acknowledgements (ACKs) for packets received on the forward link, channel information (e.g., information used for beamforming, spatial multiplexing, subband scheduling, etc.), or any other suitable information or combination thereof.

As illustrated by transmission scheme 600, each CDMA control segment spans one subband and an entire reverse link frame in each CDMA frame. The frequency channel or carrier used by a system utilizing transmission scheme 600 (e.g., system 100) may be partitioned into multiple subbands. In the non-limiting example of transmission scheme 600, a frequency carrier can be divided into four subbands. Further, each subband can include multiple subcarriers. In one example, the CDMA control segment may hop from subband to subband in different CDMA frames as illustrated by transmission scheme 600.

Figure 7:
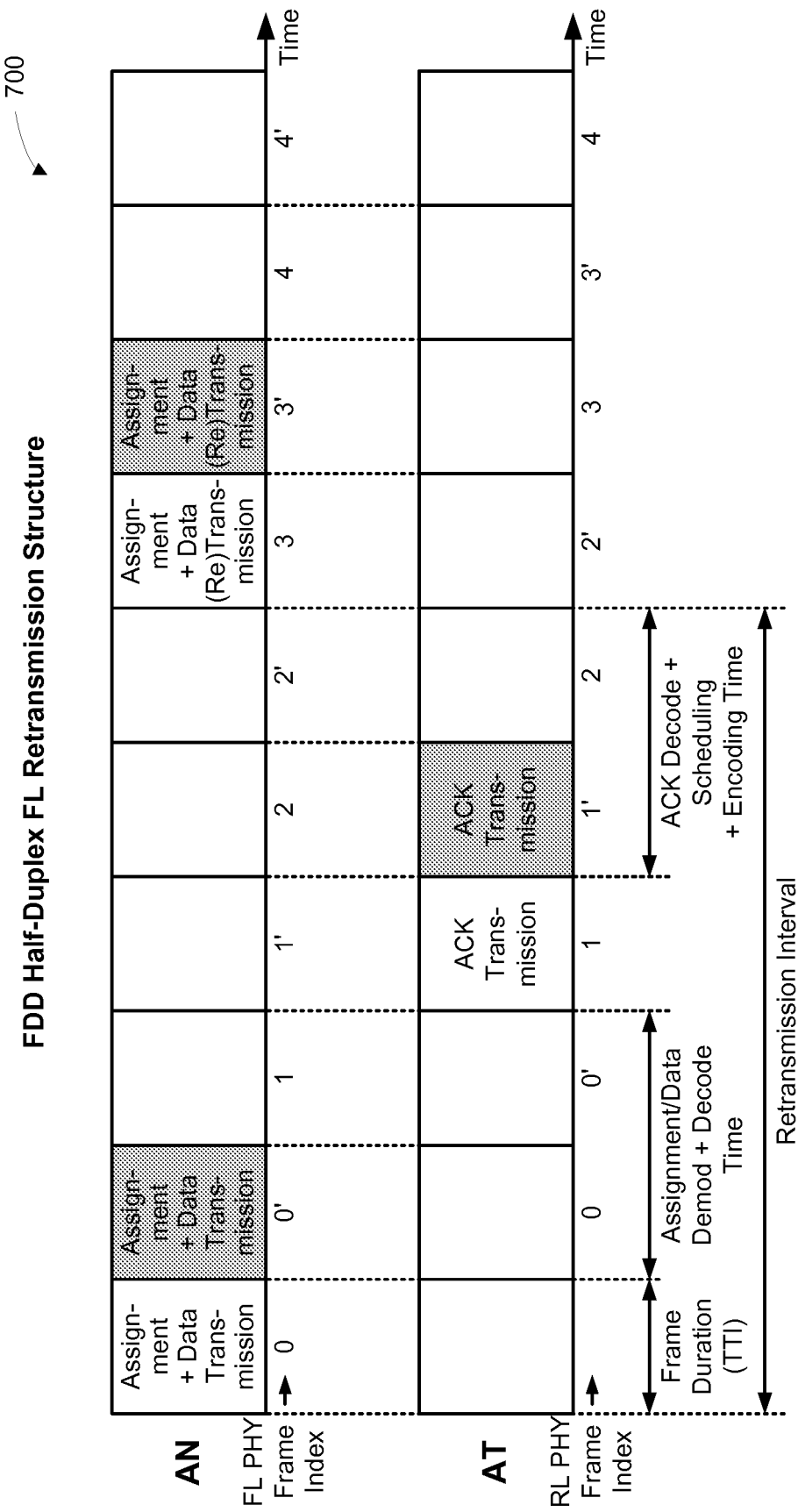
FIG. 7 illustrates an example FDD half-duplex forward link retransmission structure in accordance with various aspects.

FIG. 7 is a diagram illustrating an example FDD half-duplex forward link retransmission structure 700. In one example, a base station (e.g., a base station 110) may have data to send to a terminal a (e.g., a terminal 120) assigned to half-duplex interlace 0. The base station can send an assignment and a data transmission containing this data in forward link frame 0. Terminal a can then receive the forward link transmission from the base station, decode the assignment, determine that a data transmission is also sent, and demodulate and decode the data transmission. Upon completing these actions, terminal a can send an acknowledgement (ACK) in reverse link frame 1 if the data is decoded correctly as illustrated in retransmission structure 700. Alternatively, terminal a can send either nothing or a negative acknowledgement (NAK) if the data is decoded in error. The base station can receive and decode the ACK transmission, schedule terminal a for a new data transmission or a data retransmission if necessary, and send an assignment and a data transmission or retransmission in forward link frame 3. In accordance with one aspect, the data transmission or retransmission on the forward link and the ACK transmission on the reverse link illustrated by retransmission structure 700 may be repeated until all of the data to be sent to terminal a is sent. In one example, forward link transmissions to terminal a are sent in forward link frames of half-duplex interlace 0, and reverse link transmissions from terminal a are sent in reverse link frames of half-duplex interlace 0.

In another example, the base station may also have data to send to a terminal b assigned to half-duplex interlace 1. In this example, the base station can send data to terminal b in the same manner as for terminal a, with the exception that forward link transmissions to terminal b are sent in forward link frames of half-duplex interlace 1, and reverse link transmissions from terminal b are sent in reverse link frames of half-duplex interlace 1.

Figure 8:
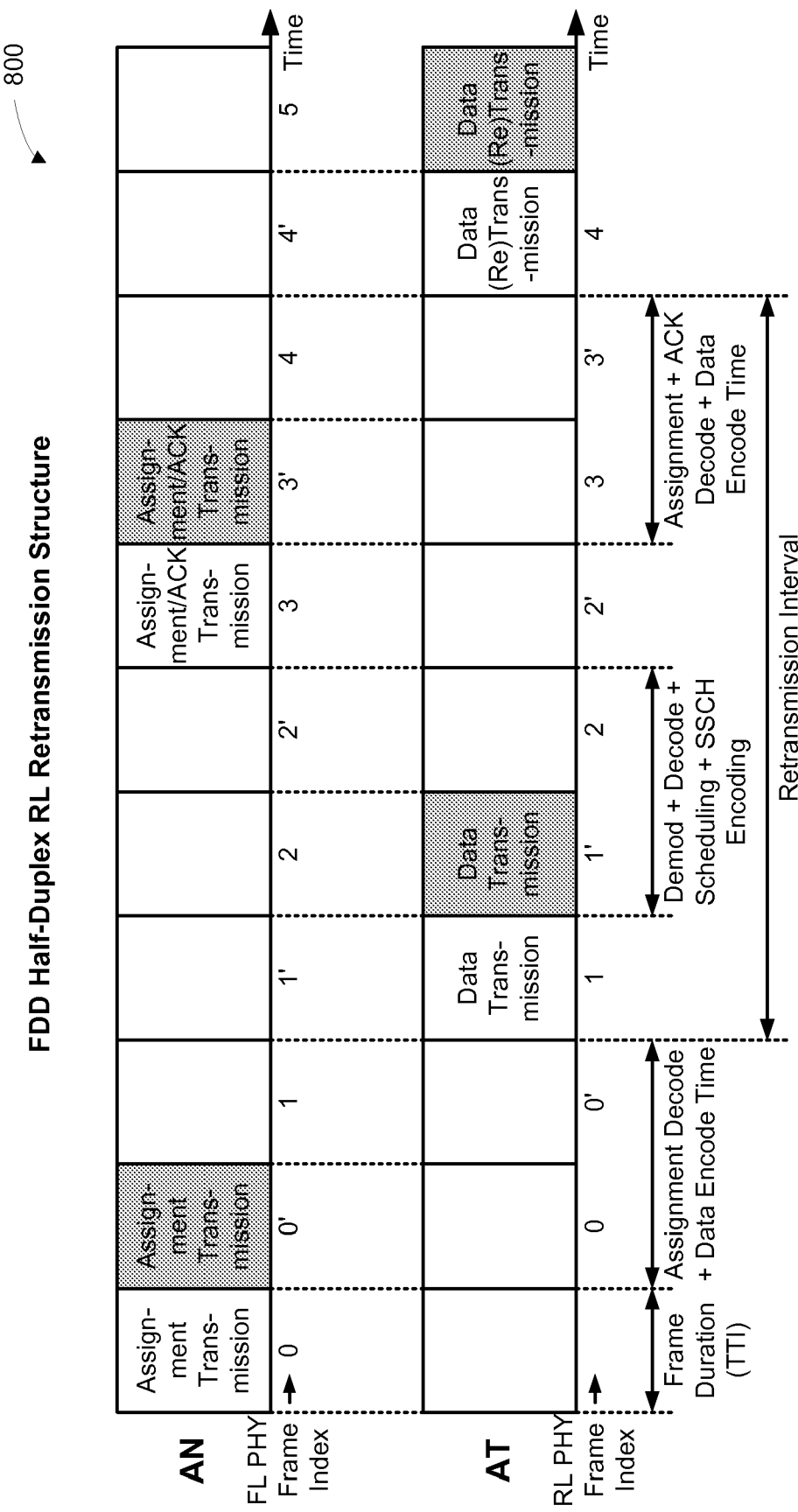
FIG. 8 illustrates an example FDD half-duplex reverse link retransmission structure in accordance with various aspects.

FIG. 8 is a diagram illustrating an example FDD half-duplex reverse link retransmission structure 800. In one example, a base station (e.g., base station 110) can send an assignment in forward link frame 0 to a terminal a (e.g., a terminal 120) assigned to half-duplex interlace 0 in order to grant terminal a resources to transmit data on the reverse link. Terminal a can then receive and decode the assignment, encode data to be sent to the base station, and send a data transmission in reverse link frame 1. The base station can then receive, demodulate and decode the data transmission from terminal a. Further, the base station may schedule terminal a for data transmission or data retransmission if necessary. Thus, the base station can send in forward link frame 3 an assignment of resources for additional transmission on the reverse link and/or an ACK for the data transmission received from terminal a. Terminal a can then receive and decode the assignment and/or ACK and send a data transmission or retransmission in reverse link frame 4. In accordance with one aspect, the assignment and ACK transmission on the forward link and the data transmission or retransmission on the reverse link illustrated by retransmission structure 800 may be repeated any number of times. In one example, forward link transmissions to terminal a are sent in forward link frames of half-duplex interlace 0, and reverse link transmissions from terminal a are sent in reverse link frames of half-duplex interlace 0.

In another example, the base station may also receive data from a terminal b assigned to half-duplex interlace 1. In this example, the transmission for terminal b may proceed in the same manner as for terminal a, with the exception that forward link transmissions to terminal b are sent in forward link frames of half-duplex interlace 1, and reverse link transmissions from terminal b are sent in reverse link frames of half-duplex interlace 1.

Figure 9:
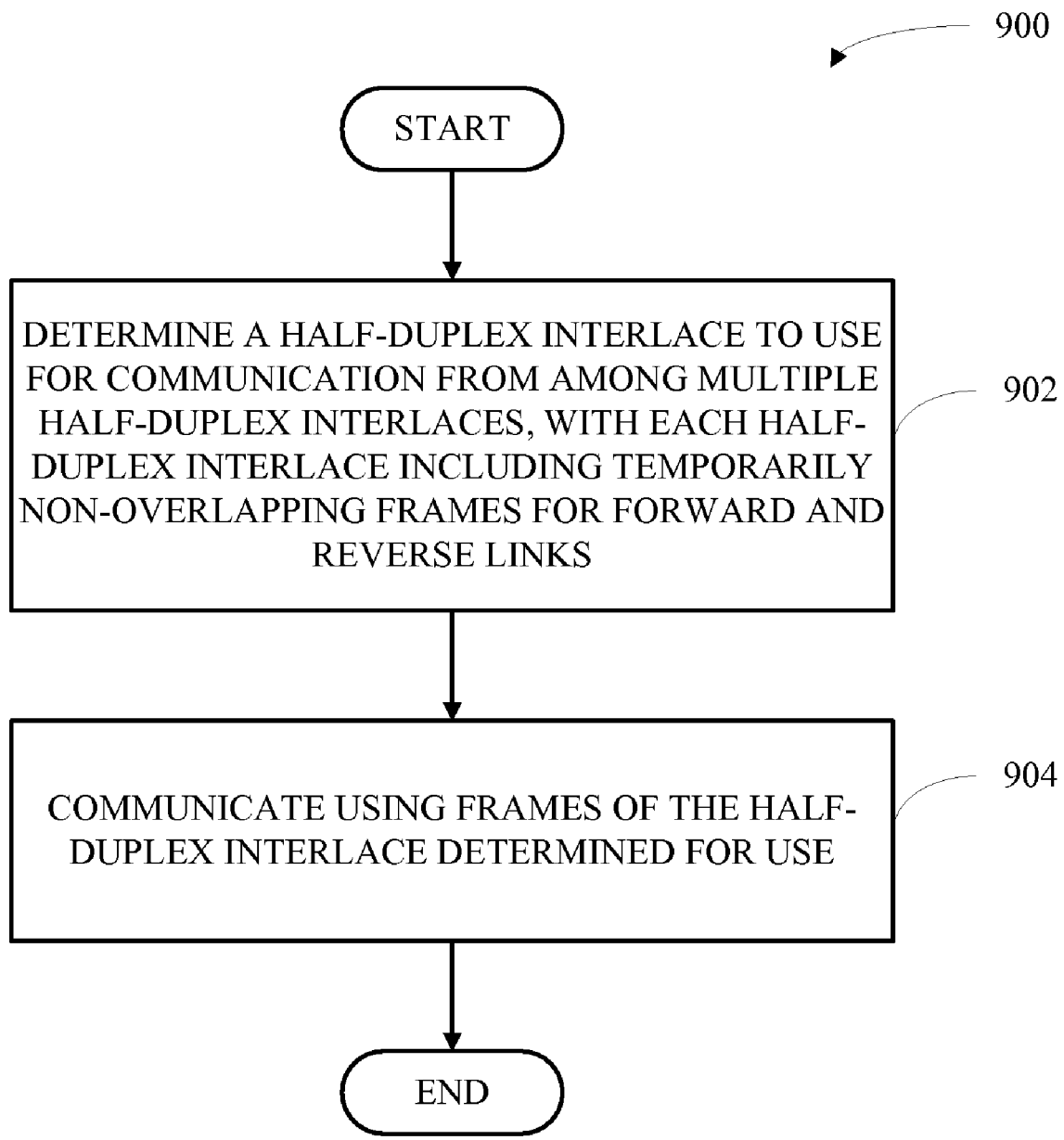
FIG. 9 is a flow diagram of a methodology for half-duplex communication in an FDD system.
Figure 10:
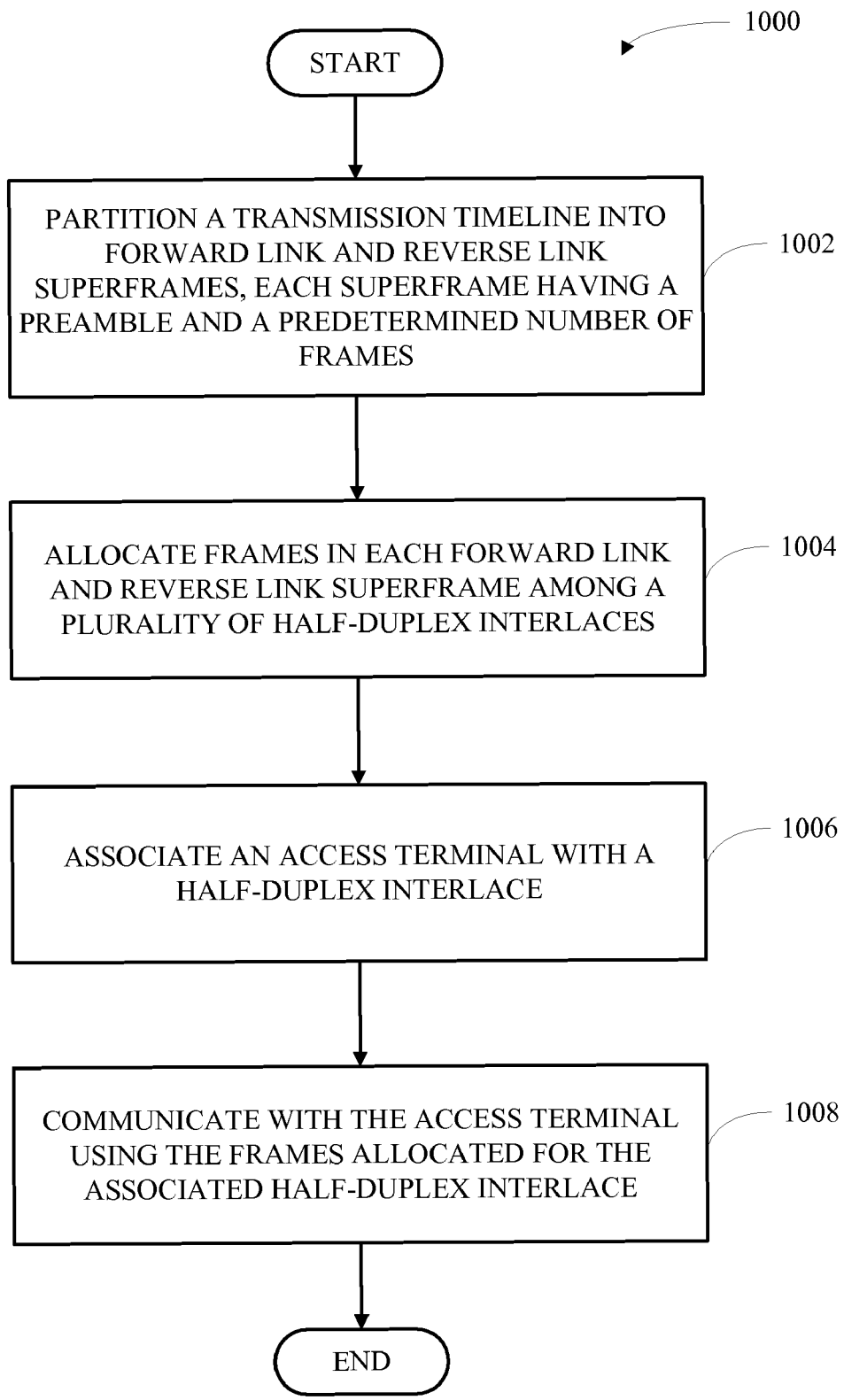
FIG. 10 is a flow diagram of a methodology for half-duplex communication in an FDD system.
Figure 11:
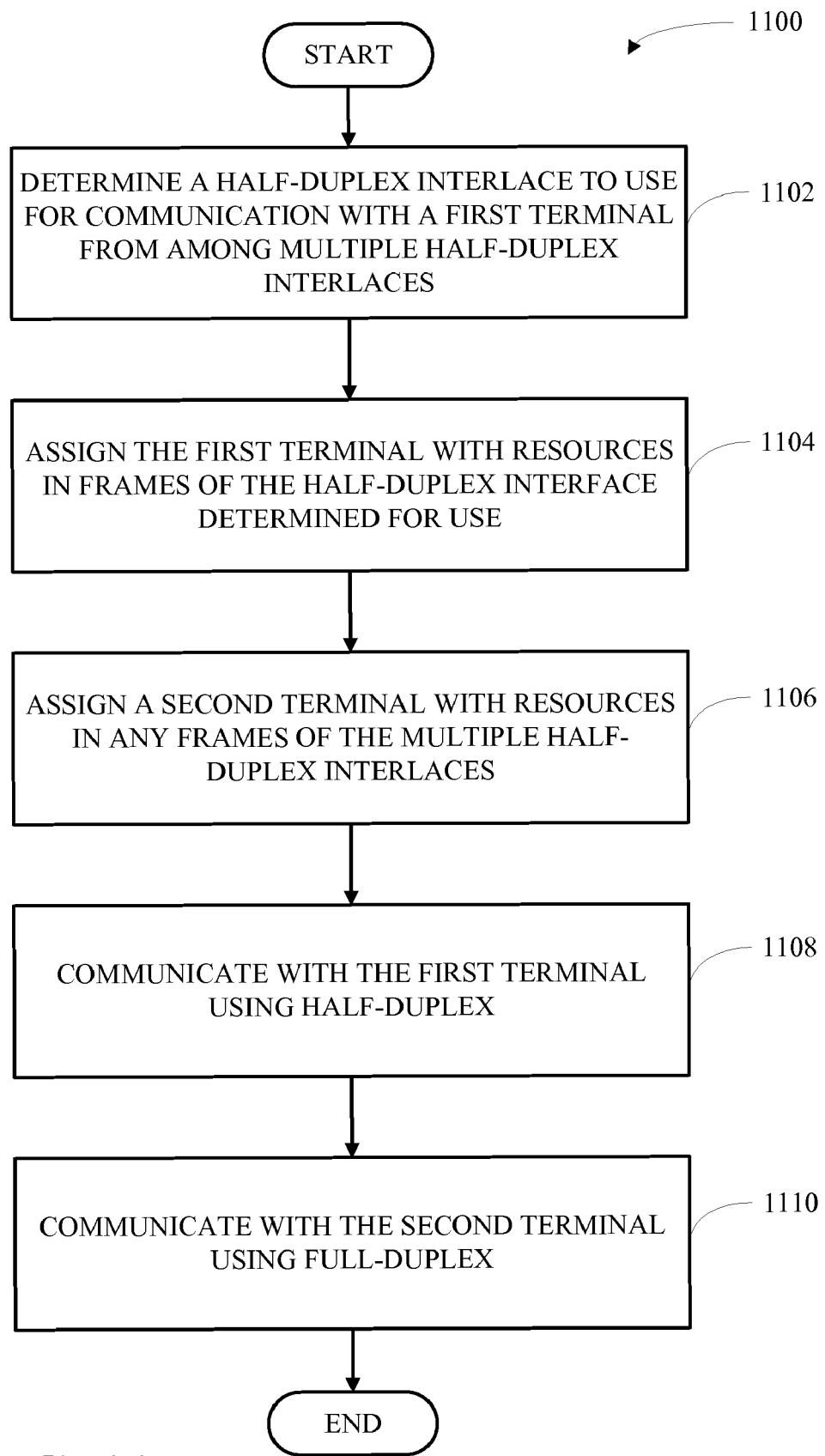
FIG. 11 is a flow diagram of a methodology for communicating with half-duplex and full-duplex terminals in an FDD system.

Referring to FIGS. 9-11, methodologies for half-duplex communication in a FDD system are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 9, illustrated is a methodology 900 for half-duplex communication in an FDD system (e.g., system 200). It is to be appreciated that methodology 900 can be performed by one or more of a terminal (e.g., an access terminal 220) and a base station (e.g., access network 210). Methodology 900 begins at block 902, wherein a half-duplex interlace to use for communication is determined from among multiple half-duplex interlaces, with each half-duplex interlace including temporally non-overlapping frames for the forward and reverse links. In accordance with one aspect, the forward link may be associated with a first frequency channel, and the reverse link may be associated with a second frequency channel. In accordance with another aspect, the multiple half-duplex interlaces include different frames such that each frame is included in only one half-duplex interlace. In a specific, non-limiting example, the multiple half-duplex interlaces can comprise a first half-duplex interlace and a second half-duplex interlace. The first half-duplex interlace can include every other frame for the forward link and every other frame for the reverse link, and the second half-duplex interlace can include the remaining frames for the forward and reverse links. It is to be appreciated that this example merely illustrates one way in which the multiple half-duplex interlaces may be defined and that other manners of defining the multiple half-duplex interlaces are possible.

Further, the half-duplex interlace to use for communication as determined in the act described in block 902 may be determined based on an identifier (e.g., a MACID) for a terminal. In a specific, non-limiting example, terminals with odd MACIDs may be assigned a first half-duplex interlace, and terminals with even MACIDs may be assigned a second half-duplex interlace. It is to be appreciated that this example merely illustrates one way in which terminals may be assigned to the multiple half-duplex interlaces and that other ways are possible.

Upon completing the act represented in block 902, the methodology continues to block 904, wherein a terminal or base station employing methodology 900 communicates using frames of the half-duplex interlace determined for use. In one example, data may be received via a first frequency channel in forward link frames of the half-duplex interlace determined for use in the act described in block 902. Additionally and/or alternatively, data may be sent via a second frequency channel in reverse link frames of the half-duplex interlace determined for use. In accordance with one aspect, data may be sent and/or received using H-ARQ transmission in a similar manner to retransmission structures 700 and 800. In accordance with another aspect, the multiple half-duplex interlaces can be associated with different CDMA control segments used to send signaling on the reverse link. By way of a non-limiting example, one CDMA control segment can be associated with each half-duplex interlace. Signaling can then be sent on the reverse link in a CDMA control segment for the half-duplex interlace determined for use in a similar manner to transmission scheme 600.

FIG. 10 illustrates a methodology 1000 for half-duplex communication in an FDD system (e.g., system 200). Methodology 1000 begins at block 1002, wherein a transmission timeline (e.g., forward link transmission timeline 510 and reverse link transmission timeline 520) is partitioned into forward link and reverse link superframes (e.g., forward link superframe 515 and reverse link superframe 525) having a superframe preamble and a predetermined number of frames. The methodology then continues to block 1004, wherein the frames in each forward link and reverse link superframe are allocated among a plurality of half-duplex interlaces (e.g., half-duplex interlace 0 and half-duplex interlace 1 illustrated by superframe structure 500).

Next, at block 1006, an access terminal (e.g., an access terminal 220) is associated with a half-duplex interlace. In one example, an access terminal can be associated with a half-duplex interlace based on an identifier (e.g., a MACID) for the access terminal. In a specific, non-limiting example, access terminals with odd MACIDs may be associated with a first half-duplex interlace, and access terminals with even MACIDs may be associated with a second half-duplex interlace. It is to be appreciated that this example merely illustrates one way in which an access terminal may be associated with a half-duplex interlace and that other ways are possible. Further, it is to be appreciated that an access terminal can be associated with a half-duplex interlace by an access network (e.g., access network 210) or the access terminal itself.

Finally, at block 1008, an access network communicates with the access terminal that was associated with a half-duplex interlace in the act described in block 1006 using the frames that were allocated in the act described in block 1004 for the half-duplex interlace associated with the access terminal. In one example, the access network and access terminal may communicate via a first frequency channel in forward link frames of the associated half-duplex interlace and via a second frequency channel in reverse link frames of the associated half-duplex interlace. In another example, the access network and access terminal may communicate using H-ARQ transmission in a similar manner to retransmission structures 700 and 800.

FIG. 11 illustrates a methodology 1100 for communicating with half-duplex and full-duplex terminals (e.g., access terminals 220) in an FDD system (e.g., system 200). Methodology 1100 begins at block 1102, wherein a half-duplex interlace to use for communication with a first terminal is determined from among multiple half-duplex interlaces. Next, at block 1104, the first terminal is assigned resources in frames of the half-duplex interlace determined for use in the act described in block 1102. The methodology 1100 then continues to block 1106, wherein a second terminal is assigned resources in any of the frames of the multiple half-duplex interlaces.

Upon completing the act described in block 1106, the methodology 1100 proceeds to block 1108, wherein a base station (e.g., access network 210) communicates with the first terminal using half-duplex. In one example, the base station can exchange data with the first terminal in frames of the half-duplex interlace determined for use in the act described in block 1102. Additionally, the base station can receive signaling from the first terminal in a CDMA control segment for this half-duplex interlace. Next, the methodology 1100 continues to block 1110, wherein the base station communicates with the second terminal using full-duplex. In one example, the base station can exchange data with the second terminal in any frame of the multiple half-duplex interlaces. Additionally, the base station can receive signaling from the second terminal in a CDMA control segment for one of the multiple half-duplex interlaces.

Figure 12:
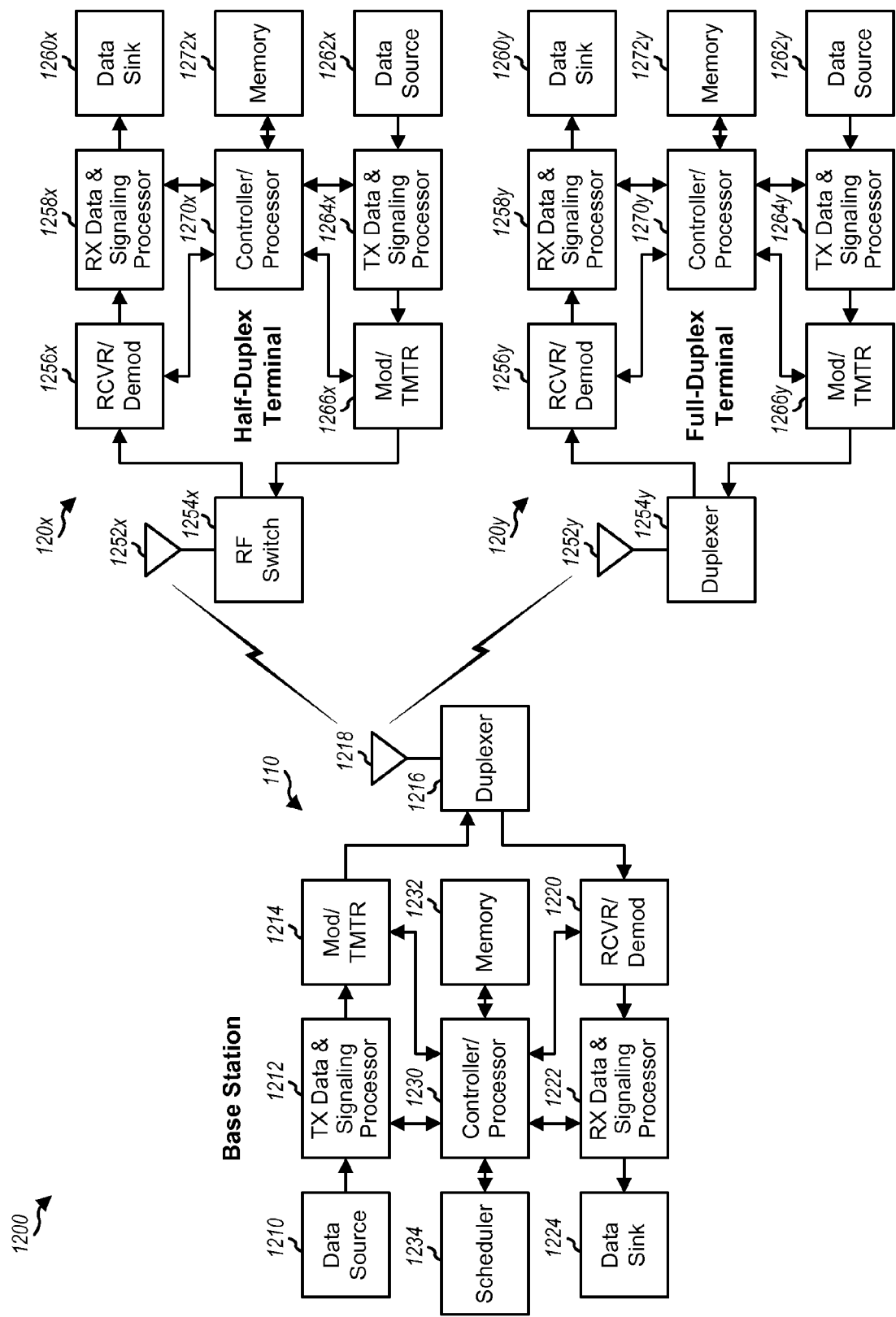
FIG. 12 is a block diagram illustrating an example wireless communication system in which one or more embodiments described herein may function.

Referring now to FIG. 12, a block diagram illustrating an example wireless communication system 1200 in which one or more embodiments described herein may function is provided. In accordance with one aspect, the system 1200 includes a base station 110, a half-duplex terminal 120x, and a full-duplex terminal 120y. In one example, base station 110 includes a transmit (TX) data and signaling processor 1212 that can receive traffic data from a data source 1210 and signaling from a controller/processor 1230 and/or a scheduler 1234. The controller/processor 1230 can provide system information for a superframe preamble and/or signaling (e.g., ACKs, PC commands, erasure indicators, . . . ) for one or more terminals communicating with base station 110, and the scheduler 1234 can provide assignments of resources (e.g., data channels, frames, and/or subcarriers) on the forward and/or reverse link for the terminals. Additionally, TX data and signaling processor 1212 can process (e.g., encode, interleave, and/or symbol map) traffic data and signaling to respectively provide data symbols and signaling symbols. Base station 110 may further include a modulator (Mod) 1214 that multiplexes pilot symbols with the data and signaling symbols, performs modulation on the multiplexed symbols (e.g., for OFDMA and/or CDMA), and provides output chips. Further, a transmitter (TMTR) 1214 can condition (e.g., convert to analog, amplify, filter, and/or upconvert frequency) the output chips and generate a forward link signal. This forward link signal can then be routed through a duplexer 1216 and transmitted via an antenna 1218.

In another example, half-duplex terminal 120x can include an antenna 1252x that receives the forward link signals from one or more base stations including base station 110. Half-duplex terminal 120x can also include a radio frequency (RF) switch 1254x that connects antenna 1252x to a receiver (RCVR) 1256x during forward link frames and connects antenna 1252x to a transmitter 1266x during reverse link frames.

Additionally and/or alternatively, full-duplex terminal 120y can include an antenna 1252y that receives the forward link signals from one or more base stations including base station 110. Full-duplex terminal 120y can also include a duplexer 1254y that routes a received signal from antenna 1252y to a receiver 1256y and further routes a reverse link signal from a transmitter 1266y to antenna 1252y.

Further, each terminal 120x and 120y can include a receiver 1256 that conditions (e.g., filters, amplifies, frequency downconverts, and/or digitizes) the received signal from antenna 1252 and provides samples. Terminals 120x and 120y may further include a demodulator (Demod) 1256 that performs demodulation on the samples (e.g., for OFDMA and/or CDMA) and provides symbol estimates. A receive (RX) data and signaling processor 1258 can also be included in terminals 120x and 120y to process (e.g., symbol demap, deinterleave, and/or decode) the symbol estimates, provide decoded data to a data sink 1260, and provide detected signaling (e.g., assignments, ACKs, PC commands, erasure indicators, . . . ) to a controller/processor 1270. In accordance with one aspect, the processing by RX data and signaling processors 1258 and demodulators 1256 is complementary to the processing by TX data and signaling processor 1212 and modulator 1214, respectively, at base station 110.

On the reverse link, a TX data and signaling processor 1264 at each terminal 120x and 120y can process traffic data from a data source 1262 and signaling from controller/processor 1270 and generate symbols. The symbols can then be modulated by a modulator 1266 and conditioned by transmitter 1266 to generate a reverse link signal. The reverse link signal can then be passed through RF switch 1254x to be transmitted via antenna 1252x in terminal 120x and/or routed through duplexer 1254y to be transmitted via antenna 1252y in terminal 120y. At base station 110, reverse link signals from one or more terminals including terminals 120x and/or 120y can be received by antenna 1218, routed through duplexer 1216, conditioned by a receiver 1220, demodulated by a demodulator 1220, and processed by an RX data and signaling processor 1222. In one example, RX data and signaling processor 1222 can provide decoded data to a data sink 1224 and detected signaling to controller/processor 1230.

In accordance with one aspect, controllers/processors 1230, 1270x and 1270y can direct the operations of various processing units at base station 110 and terminals 120x and 120y, respectively. In one example, controller/processor 1230 can implement methodologies 900, 1000, 1100, and/or other appropriate methodologies. Additionally and/or alternatively, controller/processor 1270 may implement methodologies 900, 1000, and/or other appropriate methodologies. In accordance with another aspect, memories 1232, 1272x and 1272y can store data and program codes for base station 110 and terminals 120x and 120y, respectively. Further, scheduler 1234 can schedule terminals communicating with base station 110 and assign resources (e.g., data channels, frames, and/or subcarriers) to the scheduled terminals.

Figure 13:
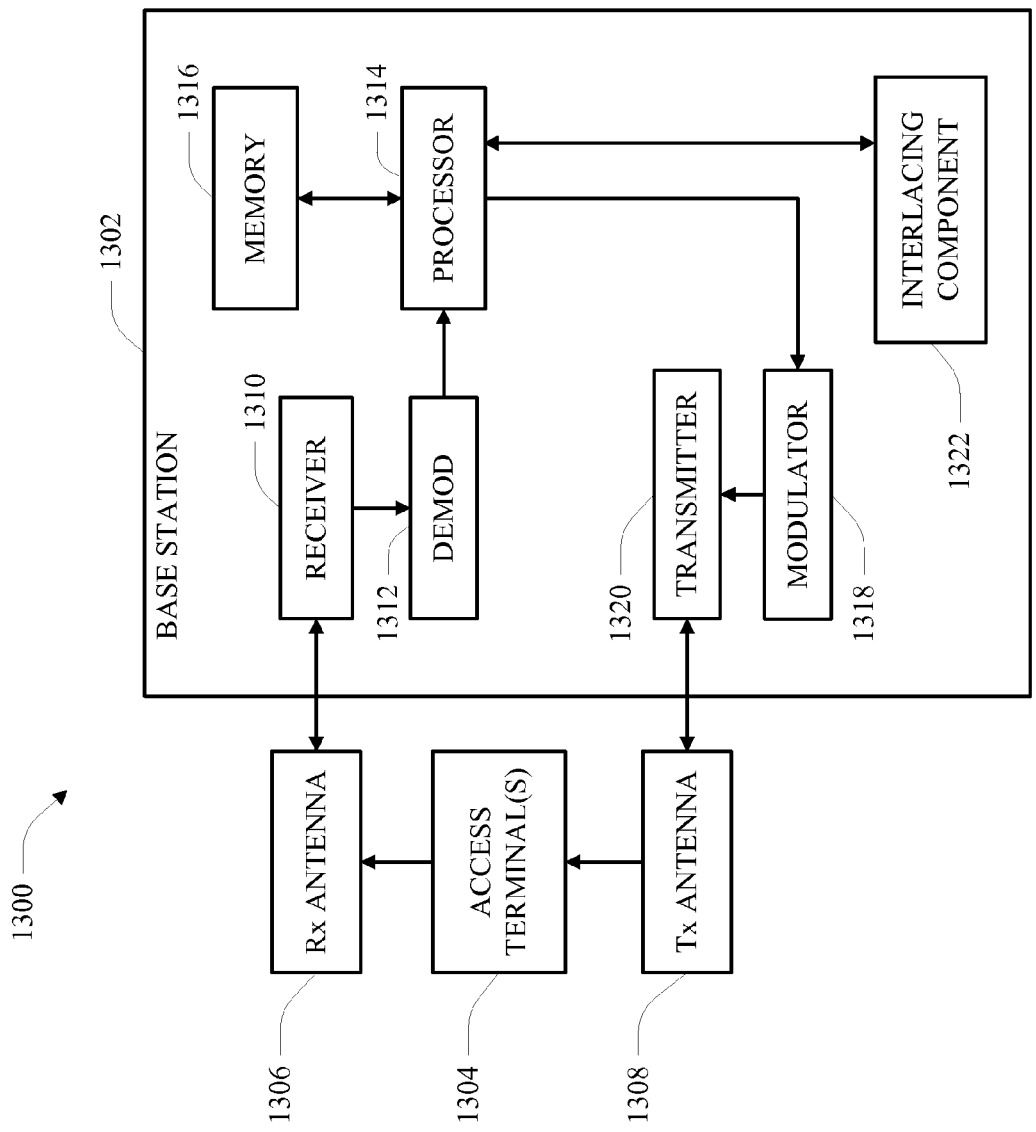
FIG. 13 is a block diagram of a system that coordinates FDD half-duplex communication in accordance with various aspects.

FIG. 13 is a block diagram of a system 1300 that coordinates FDD half-duplex communication in accordance with various aspects described herein. In one example, system 1300 includes a base station or access point 1302. As illustrated, base station 1302 can receive signal(s) from one or more access terminals 1304 via a receive (Rx) antenna 1306 and transmit to the one or more user devices 1304 via a transmit (Tx) antenna 1308.

Additionally, base station 1302 can comprise a receiver 1310 that receives information from receive antenna 1306. In one example, the receiver 1310 can be operatively associated with a demodulator (Demod) 1312 that demodulates received information. Demodulated symbols can then be analyzed by a processor 1314. Processor 1314 can be coupled to memory 1316, which can store information related to code clusters, access terminal assignments, lookup tables related thereto, unique scrambling sequences, and/or other suitable types of information. Additionally and/or alternatively, processor 1314 can be coupled to an interlacing component 1322, which can facilitate the creation of half-duplex interlaces from a transmission timeline (e.g., forward link transmission timeline 510 and reverse link transmission timeline 520) and or the assignment of one or more access terminals 1304 to one or more half-duplex interlaces. In one example, base station 1302 can employ interlace component 1322 to perform methodologies 900, 1000, 1100, and/or other similar and appropriate methodologies either in conjunction with or independent from processor 1314. Base station 1302 can also include a modulator 1318 that can multiplex a signal for transmission by a transmitter 1320 through transmit antenna 1308 to one or more access terminals 1304.

Figure 14:
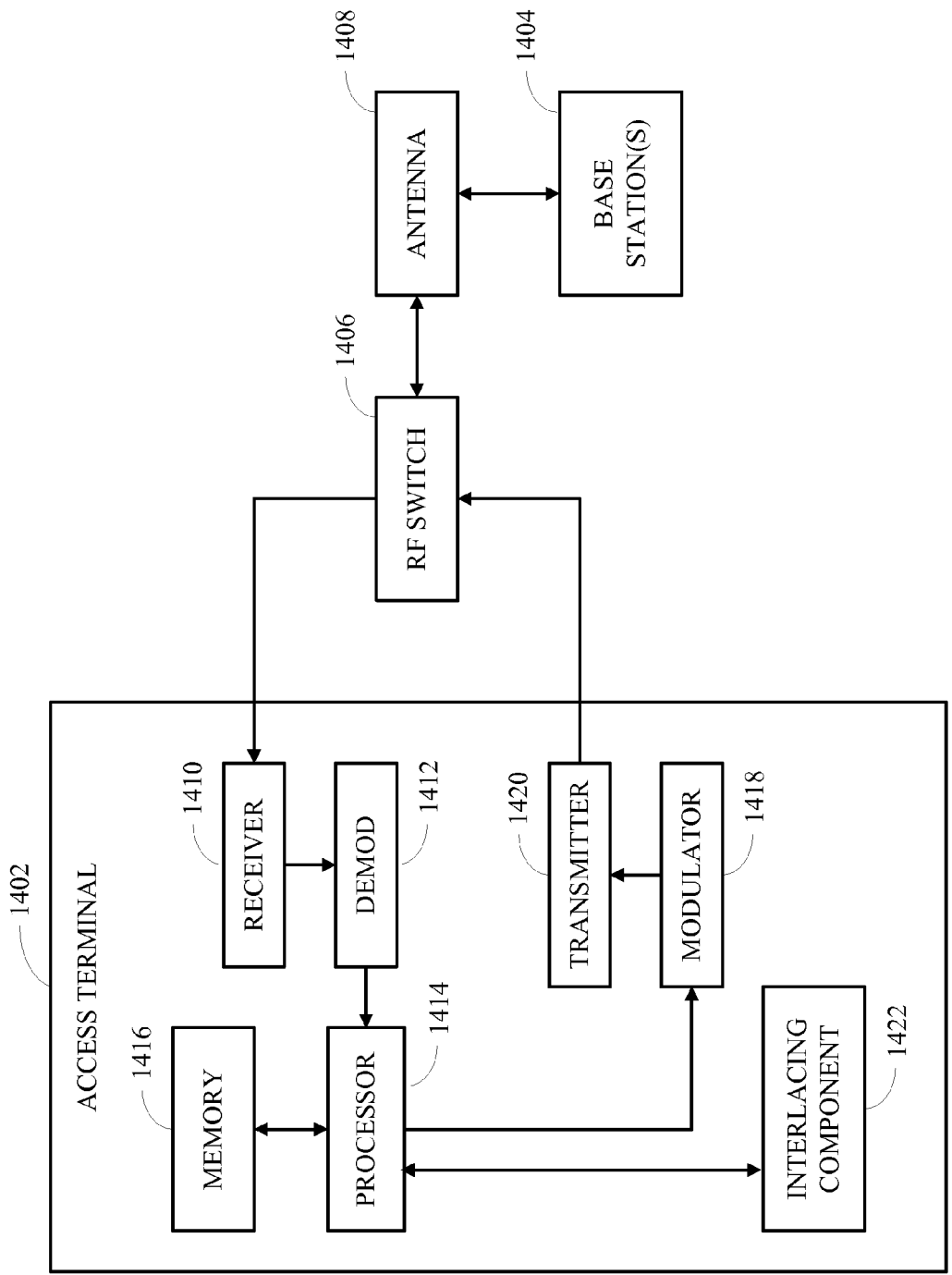
FIG. 14 is a block diagram of a system that coordinates FDD half-duplex communication in accordance with various aspects.

FIG. 14 is a block diagram of a system 1400 that coordinates FDD half-duplex communication in accordance with various aspects described herein. In one example, system 1400 includes an access terminal 1402. As illustrated, access terminal 1402 can receive signal(s) from one or more base stations 1404 and transmit to the one or more base stations 1404 via an antenna 1408. In one example, whether the antenna is operable to receive or transmit data at a given time is controlled by an RF switch 1406.

Additionally, access terminal 1402 can comprise a receiver 1410 that receives information from antenna 1408. In one example, the receiver 1410 can be operatively associated with a demodulator (Demod) 1412 that demodulates received information. Demodulated symbols can then be analyzed by a processor 1414. Processor 1414 can be coupled to memory 1416, which can store data and/or program codes related to access terminal 1402. Additionally and/or alternatively, processor 1414 can be coupled to an interlacing component 1422, which can facilitate the assignment of access terminal 1402 to a half-duplex interlace created by one or more base stations 1404. In one example, access terminal 1402 can employ interlace component 1422 to perform methodologies 900, 1000, and/or other similar and appropriate methodologies either in conjunction with or independent from processor 1414. Access terminal 1402 can also include a modulator 1418 that can multiplex a signal for transmission by a transmitter 1420 through antenna 1408 to one or more base stations 1404.

Figure 15:
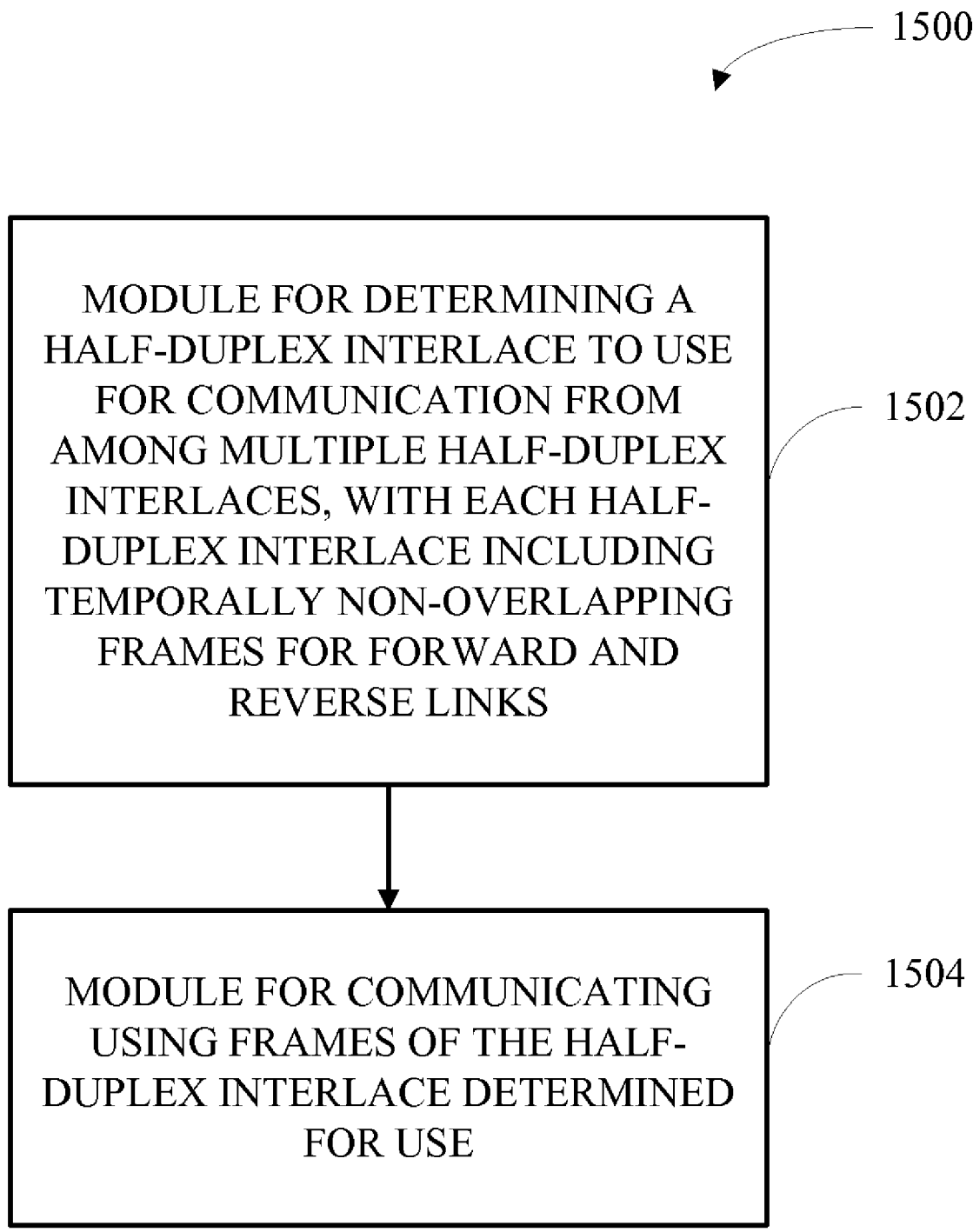
FIG. 15 is a block diagram of a system that facilitates half-duplex communication in an FDD system.

FIG. 15 illustrates a system 1500 that facilitates half-duplex communication in an FDD system. It is to be appreciated that system 1500 is represented as including functional blocks, which can be functional blocks that represent functions implemented by a processor, software, or combination thereof (e.g., firmware). System 1500 can be implemented in a base station (e.g., access network 210) or a terminal (e.g., access terminal 220) and can include a module for determining a half-duplex interlace to use for communication from among multiple half-duplex interlaces 1502. Further, system 1500 can include a module for communicating using frames of the half-duplex interlace determined for use 1504.

Figure 16:
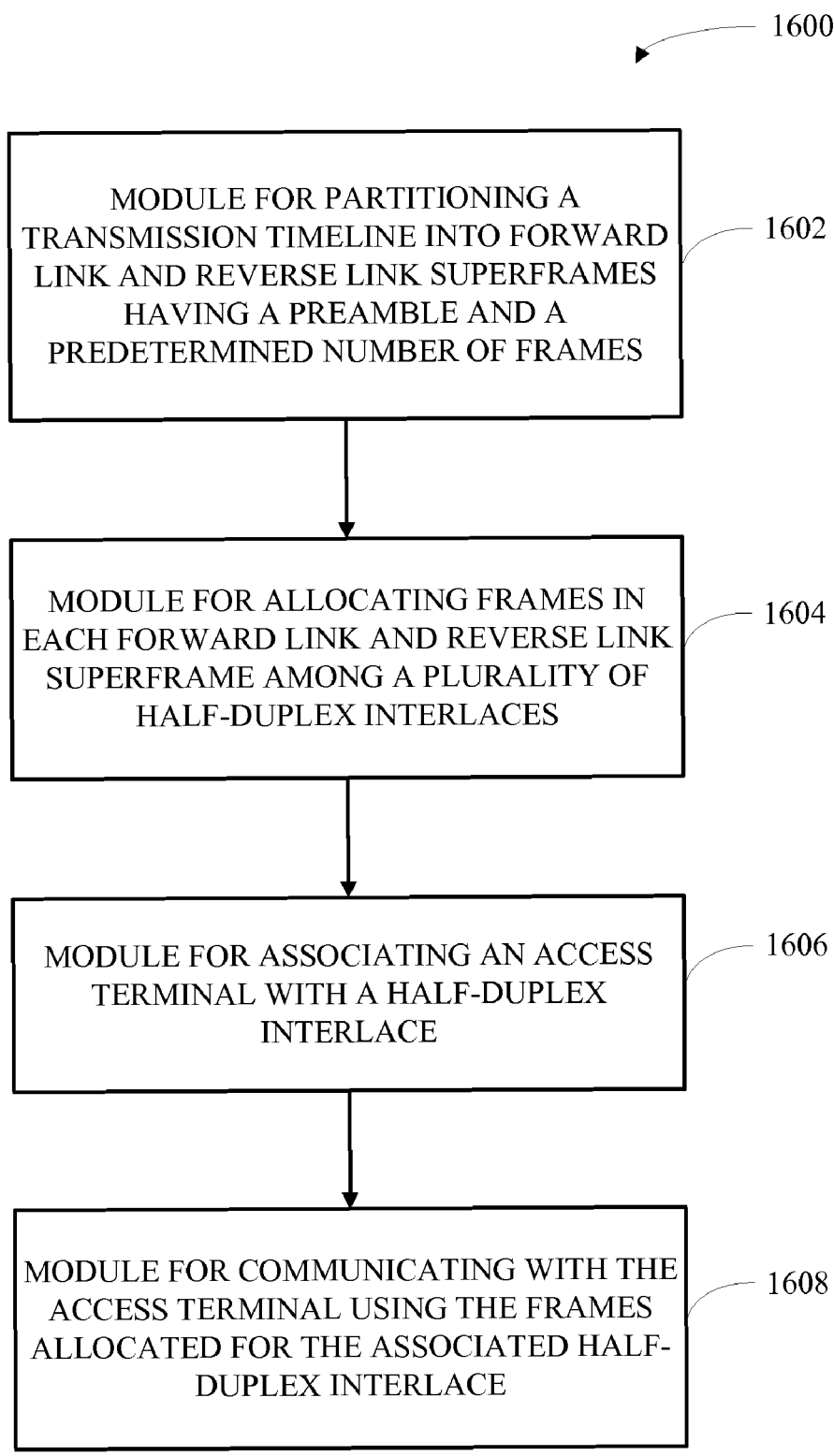
FIG. 16 is a block diagram of a system that facilitates half-duplex communication in an FDD system.

FIG. 16 illustrates a system 1600 that facilitates half-duplex communication in an FDD system. System 1600 is represented as including functional blocks, which can be functional blocks that represent functions implemented by a processor, software, or combination thereof (e.g., firmware). System 1600 can be implemented in a base station (e.g., access network 210) or a terminal (e.g., access terminal 220) and can include a module for partitioning a transmission timeline into forward link and reverse link superframes having a superframe preamble and a predetermined number of frames 1602, a module for allocating frames in each forward link and reverse link superframe among a plurality of half-duplex interlaces 1604, a module for associating an access terminal with a half-duplex interlace 1606, and a module for communicating with the access terminal using the frames allocated for the associated half-duplex interlace 1608.

Figure 17:
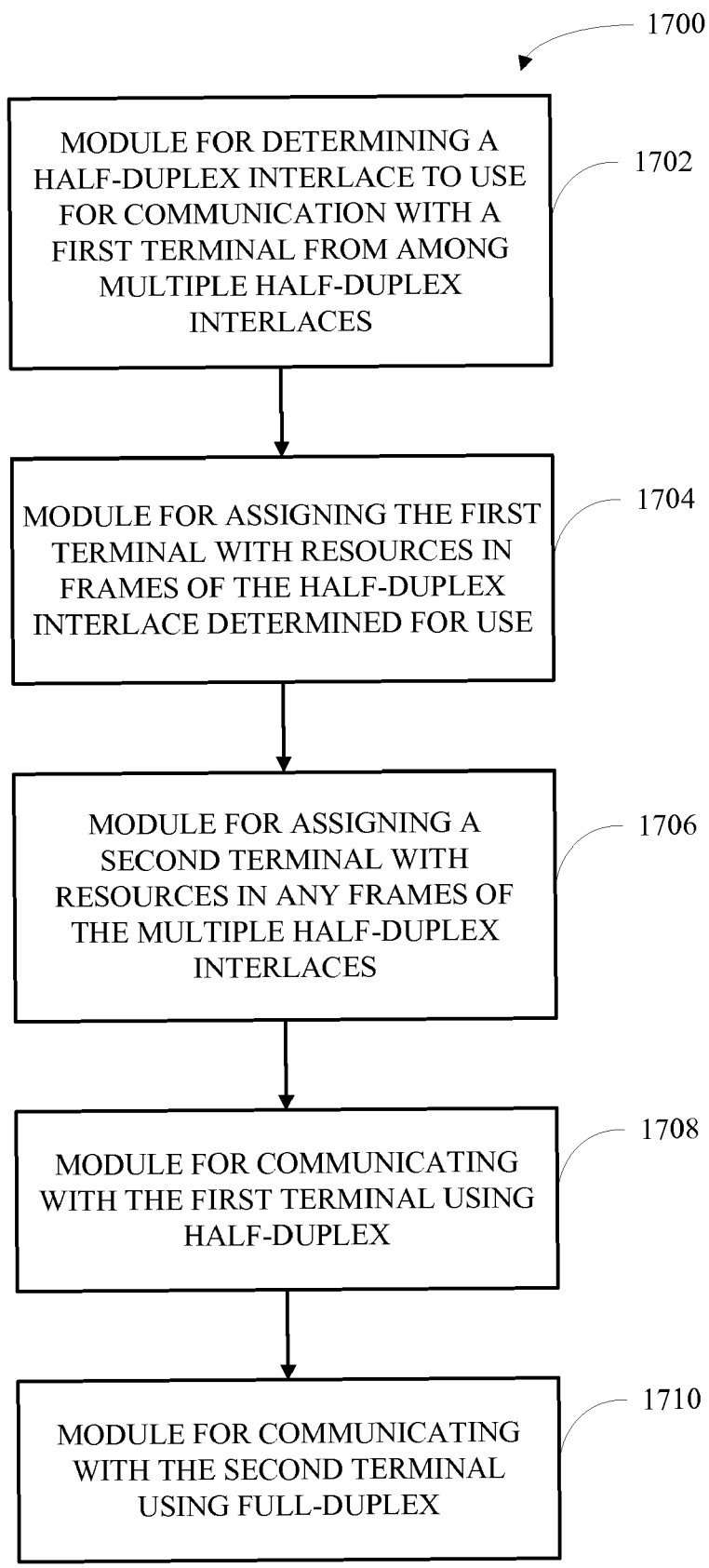
FIG. 17 is a block diagram of a system that facilitates communication with half-duplex and full-duplex terminals in an FDD system.

FIG. 17 illustrates a system 1700 that facilitates communication with half-duplex and full-duplex terminals in an FDD system. System 1700 is represented as including functional blocks, which can be functional blocks that represent functions implemented by a processor, software, or combination thereof (e.g., firmware). System 1700 can be implemented in a base station (e.g., access network 210) and can include a module for determining a half-duplex interlace to use for communication with a first terminal from among multiple half-duplex interlaces 1702, a module for assigning the first terminal with resources in frames of the half-duplex interlace determined for use 1704, a module for assigning a second terminal with resources in any of the frames of the multiple half-duplex interlaces 1706, a module for communicating with the first terminal using half-duplex 1708, and a module for communicating with the second terminal using full-duplex 1710.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method that facilitates half-duplex communication in a frequency division duplex (FDD) wireless communication system, comprising:
  determining a half-duplex interlace to use for communication from among a plurality of half-duplex interlaces, each half-duplex interlace in the plurality of half-duplex interlaces comprising temporally non-overlapping frames for a forward link and a reverse link; and
  communicating, over a wireless interface, frames of the half-duplex interlace determined for use,
  wherein the forward link is associated with a first frequency channel comprising a plurality of frequency subbands, and the reverse link is associated with a second frequency channel comprising a plurality of frequency subbands, and wherein the communicating frames of the half-duplex interlace determined for use comprises:

sending a first control segment that spans one of the plurality of frequency subbands on the forward link; and receiving a second control segment that spans one of the plurality of frequency subbands on the reverse link.

2. The method of claim 1, wherein the determining a half-duplex interlace to use includes determining the half-duplex interlace to use for communication based on an identifier for a terminal.

3. The method of claim 1, wherein the determining a half-duplex interlace to use includes determining the half-duplex interlace to use for communication based on a Medium Access Control Identifier (MACID) for a terminal.

4. The method of claim 1, wherein the communicating using frames of the half-duplex interlace determined for use includes:

sending data via the first frequency channel in forward link frames of the half-duplex interlace determined for use; and receiving data via the second frequency channel in reverse link frames of the half-duplex interlace determined for use.

5. The method of claim 1, wherein the first control segment comprises one or more of at least one power control command on a forward link dedicated power control channel (F-PCCH) or at least one pilot quality indicator on a forward link pilot quality indicator channel (F-PQICH).

6. The method of claim 1, wherein the first control segment comprises interference information on one or more of a forward link interference over thermal channel (F-IOTCH) or a forward link fast other sector interference channel (F-FOSICH).

7. The method of claim 1, wherein the first control segment is on a forward link shared control channel (F-SCCH).

8. The method of claim 1, wherein the first control segment comprises at least one pilot on one or more of a forward link CQI pilot channel (F-CQIPICH) or a forward link beacon pilot channel (F-BPICH).

9. The method of claim 1, wherein the determining of the half-duplex interlace to use comprises selecting the half-duplex interlace from a first half-duplex interlace and a second half-duplex interlace.

10. The method of claim 1, wherein the communicating using frames of the half-duplex interlace determined for use comprises:

assigning a first terminal with resources in frames of the half-duplex interlace determined for use;

assigning a second terminal with resources in any frames of the plurality of half-duplex interlaces;

communicating with the first terminal using half-duplex; and communicating with the second terminal using full-duplex.

11. The method of claim 1, wherein the communicating using frames of the half-duplex interlace determined for use comprises at least one of sending data via hybrid automatic repeat request (H-ARQ) transmission or receiving data via H-ARQ transmission.

12. An apparatus for use in a frequency division duplex (FDD) wireless communication system, comprising:

a memory for storing data relating to a plurality of half-duplex interlaces, wherein each of the plurality of half-duplex interlaces comprises temporally non-overlapping frames for a forward link and a reverse link; and a processor configured to:

determine a half-duplex interlace to use for communication from among the plurality of half-duplex interlaces; and communicate using frames of the half-duplex interlace determined for use, wherein the forward link is associated with a first frequency channel comprising a plurality of frequency subbands, and the reverse link is associated with a second frequency channel comprising a plurality of frequency subbands, and wherein the communicating using frames of the half-duplex interlace determined for use comprises:

sending a first control segment that spans one of the plurality of frequency subbands on the forward link; and receiving a second control segment that spans one of the plurality of frequency subbands on the reverse link.

13. The wireless communications apparatus of claim 12, wherein the frames for the forward link and the frames for the reverse link abut one another.

14. The wireless communications apparatus of claim 12, wherein a guard time is provided between the frames for the forward link and the frames for the reverse link that is of sufficient length to allow a terminal to switch between transmitting and receiving or between receiving and transmitting.

15. The wireless communications apparatus of claim 12, wherein the plurality of half-duplex interlaces is a first half-duplex interlace and a second half-duplex interlace, and the first half-duplex interlace and the second half-duplex interlace comprise frames for the forward link and the reverse link such that each frame is included in one of the first half-duplex interlace or the second half-duplex interlace.

16. The wireless communications apparatus of claim 15, wherein the first half-duplex interlace comprises every other frame for the forward link and every other frame for the reverse link, and the second half-duplex interlace includes the remaining frames for the forward link and the reverse link.

17. The wireless communications apparatus of claim 16, wherein a first terminal having an odd Medium Access Control Identifier (MACID) is assigned to the first half-duplex interlace and a second terminal having an even MACID is assigned to the second half-duplex interlace.

18. The wireless communications apparatus of claim 16, wherein the processor is further configured to alter its determination of a half-duplex interlace to use by assigning a new MACID for at least one of the first terminal or the second terminal.

19. An apparatus that facilitates half-duplex communication in a frequency division duplex (FDD) wireless communication system, comprising:

means for determining a half-duplex interlace to use for communication from among a plurality of half-duplex interlaces, each half-duplex interlace in the plurality of half-duplex interlaces comprising frames for a forward link and a reverse link; and means for communicating using frames of the half-duplex interlace determined for use, wherein the forward link is associated with a first frequency channel comprising a plurality of frequency subbands, and the reverse link is associated with a second frequency channel comprising a plurality of frequency subbands, and wherein the means for communicating using frames of the half-duplex interlace determined for use comprises:
means for sending a first control segment that spans one of the plurality of frequency subbands on the forward link; and
means for receiving a second control segment that spans one of the plurality of frequency subbands on the reverse link.

20. The apparatus of claim 19, wherein the means for determining a half-duplex interlace to use further comprises means for determining the half-duplex interlace to use based at least in part on a MACID for a terminal.

21. The apparatus of claim 20, further comprising means for altering the half-duplex interlace determined for use by changing the MACID for the terminal.

22. The apparatus of claim 19, wherein the means for communicating using frames of the half-duplex interlace determined for use comprises:
means for communicating with a first terminal using half-duplex; and
means for communicating with a second terminal using full-duplex.

23. The apparatus of claim 22, wherein the means for communicating using frames of the half-duplex interlace determined for use further comprises:
means for assigning the first terminal with resources in frames of the half-duplex interlace determined for use; and
means for assigning the second terminal with resources in any frames of the plurality of half-duplex interlaces.

24. The apparatus of claim 22, wherein the means for communicating using frames of the half-duplex interlace determined for use further includes:
means for exchanging at least one of data and signaling with the first terminal in frames of the half-duplex interlace determined for use; and
means for exchanging at least one of data and signaling with the second terminal in any frames of the plurality of half-duplex interlaces.

25. A non-transitory computer-readable medium having stored thereon computer-executable instructions for half-duplex communication in a frequency division duplex (FDD) wireless communication system, the instructions comprising:
code for allocating frames of a forward link and a reverse link among a plurality of half-duplex interlaces such that each of the plurality of half-duplex interlaces has temporally non-overlapping frames;
code for associating an access terminal with a half-duplex interlace from the plurality of half-duplex interlaces; and
code for communicating with the access terminal using frames allocated for the associated half-duplex interlace,
wherein the forward link is associated with a first frequency channel comprising a plurality of frequency subbands, and the reverse link is associated with a second frequency channel comprising a plurality of frequency subbands, and
wherein the code for communicating frames of the half-duplex interlace determined for use comprises:
code for sending a first control segment that spans one of the plurality of frequency subbands on the forward link; and
code for receiving a second control segment that spans one of the plurality of frequency subbands on the reverse link.

26. The non-transitory computer-readable medium of claim 25, wherein the plurality of half-duplex interlaces is a first half-duplex interlace and a second half-duplex interlace, and the first half-duplex interlace includes every other frame for the forward link and every other frame for the reverse link, and the second half-duplex interlace includes the remaining frames for the forward link and the reverse link.

27. The non-transitory computer-readable medium of claim 26, wherein the instructions for associating an access terminal with a half-duplex interlace includes instructions for:
associating the access terminal with the first half-duplex interlace if a MACID of the access terminal is odd; and
associating the access terminal with the second half-duplex interlace if the MACID of the access terminal is even.

28. A method that facilitates half-duplex communication in a frequency division duplex (FDD) wireless communication system, comprising:
associating with a half-duplex interlace chosen from a plurality of half-duplex interlaces for communication with an access network, each half-duplex interlace including temporally non-overlapping frames for a forward link and a reverse link; and
communicating, over a wireless interface, with the access network using frames of the associated half-duplex interlace,
wherein the forward link is associated with a first frequency channel comprising a plurality of frequency subbands, and the reverse link is associated with a second frequency channel comprising a plurality of frequency subbands, and
wherein the communicating with the access network comprises:
receiving a first control segment that spans one of the plurality of frequency subbands on the forward link; and
sending a second control segment that spans one of the plurality of frequency subbands on the reverse link.

29. The method of claim 28, wherein the communicating with the access network comprises:
receiving data via the first frequency channel in forward link frames of the associated half-duplex interlace; and
sending data via the second frequency channel in reverse link frames of the associated half-duplex interlace.

30. The method of claim 28, wherein the second control segment comprises at least one of a CDMA control segment or an OFDMA control segment for the associated half-duplex interlace.

31. The method of claim 28, wherein the first control segment comprises at least one of a CDMA control segment or an OFDMA control segment for the associated half-duplex interlace.

32. The method of claim 31, wherein the first control segment further comprises at least one power control command on a forward link dedicated power control channel (F-PCCH) or at least one pilot quality indicator on a forward link pilot quality indicator channel (F-PQICH).

33. The method of claim 31, wherein the first control segment further comprises interference information on one or more of a forward link interference over thermal channel (F-IOTCH) or a forward link fast other sector interference channel (F-FOSICH).

34. The method of claim 31, wherein the first control segment further comprises signaling on a forward link shared control channel (F-SCCH).

35. The method of claim 31, wherein the first control segment further comprises at least one pilot on one or more of a forward link CQI pilot channel (F-CQIPICH) or a forward link beacon pilot channel (F-BPICH).

36. An apparatus for half-duplex communication on a frequency division duplex (FDD) wireless communication system, comprising:
   a memory for storing data relating to an associated half-duplex interlace, the selected half-duplex interlace comprising temporally non-overlapping frames for a forward link and a reverse link; and
   a processor configured to communicate with an access network using frames of the associated half-duplex interlace,
   wherein the forward link is associated with a first frequency channel comprising a plurality of frequency subbands, and the reverse link is associated with a second frequency channel comprising a plurality of frequency subbands, and
   wherein the communicating with the access network comprises:
      receiving a first control segment that spans one of the plurality of frequency subbands on the forward link; and
      sending a second control segment that spans one of the plurality of frequency subbands on the reverse link.

37. An apparatus that facilitates half-duplex communication in a frequency division duplex (FDD) wireless communication system, comprising:
   means for associating with a half-duplex interlace chosen from a plurality of half-duplex interlaces for communication with an access network, each half-duplex interlace including frames for a forward link and a reverse link; and
   means for communicating with the access network using frames of the associated half-duplex interlace,
   wherein the forward link is associated with a first frequency channel comprising a plurality of frequency subbands, and the reverse link is associated with a second frequency channel comprising a plurality of frequency subbands, and
   wherein the means for communicating with the access network comprises:
      means for receiving a first control segment that spans one of the plurality of frequency subbands on the forward link; and
      means for sending a second control segment that spans one of the plurality of frequency subbands on the reverse link.

38. A non-transitory computer-readable medium having stored thereon computer-executable instructions for half-duplex communication in a frequency division duplex (FDD) wireless communication system, the instructions comprising:
   code for associating with a half-duplex interlace selected from a plurality of half-duplex interlaces, each of the plurality of half-duplex interlaces having allocated frames of a forward link and a reverse link such that each of the plurality of half-duplex interlaces has temporally non-overlapping frames; and
   code for communicating, over a wireless interface, with an access network using the allocated frames for the associated half-duplex interlace,
   wherein the forward link is associated with a first frequency channel comprising a plurality of frequency subbands, and the reverse link is associated with a second frequency channel comprising a plurality of frequency subbands, and
   wherein the communicating with the access network comprises:
      code for receiving a first control segment that spans one of the plurality of frequency subbands on the forward link; and
      code for sending a second control segment that spans one of the plurality of frequency subbands on the reverse link.

39. A processor for half-duplex communication in a frequency division duplex (FDD) wireless communication system, the processor comprising:
   a receiving module configured to receive an assignment of resources in frames of a half-duplex interlace selected from a plurality of half-duplex interlaces, each of the plurality of half-duplex interlaces having allocated frames of a forward link and a reverse link; and
   a communicating module configured to communicate, over a wireless interface, with an access network using the assigned resources,
   wherein the forward link is associated with a first frequency channel comprising a plurality of frequency subbands, and the reverse link is associated with a second frequency channel comprising a plurality of frequency subbands, and
   wherein the communicating module is configured to communicate with the access network by:
      receiving a first control segment that spans one of the plurality of frequency subbands on the forward link; and
      sending a second control segment that spans one of the plurality of frequency subbands on the reverse link.

40. The processor of claim 39, wherein the communicating module is further configured to communicate with the access network by exchanging data with the access network in frames of the selected half-duplex interlace.

41. The method of claim 1, wherein the sending of the first control segment comprises sending at least one control segment during each of a plurality of frames, and wherein the at least one control segment hops from a first subband of the plurality of frequency subbands to a second subband of the plurality of frequency subbands in different frames of the plurality of frames.

42. A processor for half-duplex communication in a frequency division duplex (FDD) wireless communication system, the processor comprising:
   a determining module configured to determine a half-duplex interlace to use for communication from among a plurality of half-duplex interlaces, each half-duplex interlace in the plurality of half-duplex interlaces comprising temporally non-overlapping frames for a forward link and a reverse link; and
   a communicating module configured to communicate, over a wireless interface, frames of the half-duplex interlace determined for use,
   wherein the forward link is associated with a first frequency channel comprising a plurality of frequency subbands, and the reverse link is associated with a second frequency channel comprising a plurality of frequency subbands, and
   wherein the communicating module is configured to communicate frames of the half-duplex interlace determined for use by:
      sending a first control segment that spans one of the plurality of frequency subbands on the forward link; and
      receiving a second control segment that spans one of the plurality of frequency subbands on the reverse link.

43. The method of claim 1, wherein the method further comprises:
  determining if a terminal is configured for full-duplex operation or half-duplex operation;
  communicating over a wireless interface with the terminal using frames of the half-duplex interlace determined for use if the terminal is configured for half-duplex operation; and
  communicating over a wireless interface with the terminal using frames of any of the plurality of half-duplex interlaces if the terminal is configured for full-duplex operation.

44. The apparatus of claim 12, wherein the processor is further configured to:
  assign a first terminal with resources in frames of the half-duplex interlace determined for use;
  assign a second terminal with resources in any frames of the plurality of half-duplex interlaces;
  communicate with the first terminal using half-duplex; and
  communicate with the second terminal using full-duplex.

45. The apparatus of claim 12, wherein the processor is further configured to:
  determine if a terminal is configured for full-duplex operation or half-duplex operation;
  communicate over a wireless interface with the terminal using frames of the half-duplex interlace determined for use if the terminal is configured for half-duplex operation; and
  communicate over a wireless interface with the terminal using frames of any of the plurality of half-duplex interlaces if the terminal is configured for full-duplex operation.

46. The apparatus of claim 19, the apparatus further comprising:
  means for assigning a first terminal with resources in frames of the half-duplex interlace determined for use;
  means for assigning a second terminal with resources in any frames of the plurality of half-duplex interlaces;
  means for communicating with the first terminal using half-duplex; and
  means for communicating with the second terminal using full-duplex.

47. The apparatus of claim 19 further comprising:
  means for determining if a terminal is configured for full-duplex operation or half-duplex operation;
  means for communicating over a wireless interface with the terminal using frames of the half-duplex interlace determined for use if the terminal is configured for half-duplex operation; and
  means communicating over a wireless interface with the terminal using frames of any of the plurality of half-duplex interlaces if the terminal is configured for full-duplex operation.

48. The non-transitory computer-readable medium of claim 25, the instructions further comprising:
  code for assigning a first terminal with resources in frames of the half-duplex interlace determined for use;
  code for assigning a second terminal with resources in any frames of the plurality of half-duplex interlaces;
  code for communicating with the first terminal using half-duplex; and
  code for communicating with the second terminal using full-duplex.

49. The non-transitory computer-readable medium of claim 25, wherein the instructions further comprise:
  code for determining if a terminal is configured for full-duplex operation or half-duplex operation;
  code for communicating over a wireless interface with the terminal using frames of the half-duplex interlace determined for use if the terminal is configured for half-duplex operation; and
  code for communicating over a wireless interface with the terminal using frames of any of the plurality of half-duplex interlaces if the terminal is configured for full-duplex operation.

* * * * *